US012747964B2

(12) United States Patent
Cunningham et al.

(10) Patent No.: US 12,747,964 B2
(45) Date of Patent: Sep. 29, 2026

(54) SYSTEMS AND METHODS FOR DETECTING SECURITY STATUS

(71) Applicant: Comcast Cable Communications, LLC, Philadelphia, PA (US)

(72) Inventors: Ryan Cunningham, Philadelphia, PA (US); David Yorkey, Wilmington, DE (US)

(73) Assignee: Comcast Cable Communications, LLC, Philadelphia, PA (US)

(*) Notice: Subject to any disclaimer, the term of this patent is extended or adjusted under 35 U.S.C. 154(b) by 203 days.

(21) Appl. No.: 18/624,548

(22) Filed: Apr. 2, 2024

(65) Prior Publication Data

US 2025/0305854 A1 Oct. 2, 2025

(51) Int. Cl.
*G01D 5/14* (2006.01)

(52) U.S. Cl.
CPC .................................... *G01D 5/145* (2013.01)

(58) Field of Classification Search
CPC ...................................................... G01D 5/145
See application file for complete search history.

(56) References Cited

U.S. PATENT DOCUMENTS

| | | | | |
|---|---|---|---|---|
| 4,916,821 | A * | 4/1990 | Potter | G01C 17/28 33/362 |
| 9,062,989 | B2 * | 6/2015 | van Veldhoven | G01D 5/2451 |
| 9,316,022 | B2 * | 4/2016 | Tyner | E05B 17/22 |
| 9,576,469 | B2 * | 2/2017 | Modi | G08B 29/185 |
| 9,952,029 | B2 * | 4/2018 | Modi | G06T 11/60 |
| 10,371,549 | B2 * | 8/2019 | Lee | G01D 5/145 |
| 10,502,591 | B2 * | 12/2019 | Mednikov | G01D 5/145 |
| 11,573,072 | B2 * | 2/2023 | Schmitt | G01D 5/145 |
| 2003/0052780 | A1 | 3/2003 | Buckley | |
| 2016/0210616 | A1 * | 7/2016 | Lee | G06K 19/07779 |

OTHER PUBLICATIONS

Murphy, et al; "The Emergence, Motion, and Disappearance of Magnetic Null Points", SHINE Conference, Stowe, VT Jul. 6-Oct. 2015 (Year: 2015).*

* cited by examiner

*Primary Examiner* — John A Tweel, Jr.
(74) *Attorney, Agent, or Firm* — Banner & Witcoff, Ltd.

(57) ABSTRACT

Systems, apparatuses, and methods for determining a security status are described. Magnetic fields may be detected by sensors that are positioned to determine the location of a magnet. The location of the magnet may be used to determine the configuration of an object to which the magnet is attached. The use of multiple sensors may be used to detect null regions of magnetic fields that may not be detected by one of the sensors. Further, potential malfunctions in the sensors may be determined automatically.

16 Claims, 12 Drawing Sheets

SYSTEMS AND METHODS FOR DETECTING SECURITY STATUS

BACKGROUND

A security system may enhance security by detecting a security condition (e.g., unauthorized access to a secured area) has been met and raising an alarm when the security condition has been met. Further, changes in the security condition may be detected by a sensor. For example, the security system in an automobile may include sensors that detect the application of excessive pressure to windows of the automobile or the breakage of a window. However, there are circumstances in which an alarm may be raised without a security condition being met. Alternatively, an alarm may not be raised despite a security condition being met. Such circumstances may be due to limitations of the sensors that detect the security condition and/or the way in which the sensors that detect the security condition are configured.

SUMMARY

The following summary presents a simplified summary of certain features. The summary is not an extensive overview and is not intended to identify key or critical elements.

Systems, apparatuses, and methods are described for a security system that may be used to detect and/or determine the position of an object (e.g., a magnet attached to a door or window) based on the detection of a magnetic field that is generated by the magnet. The disclosed technology allows for the automated determination of the configuration of an object based on the detection of magnetic fields using multiple sensors. The use of multiple sensors may improve the detection of magnetic fields by using a first sensor to detect a magnetic field in one or more regions and one or more additional sensors to detect the magnetic field in regions where a magnetic field is not detectable by the first sensor.

The disclosed technology may provide a more effective way to detect magnetic fields of a magnet when a magnet is in a location in which the magnetic fields may not be detectable by a single sensor. Further, the disclosed technology may allow for improved security through a reduction in false negatives in which a door or window is determined to be closed based on inaccuracy in the detection of magnetic fields. Further, the disclosed technology may reduce the incidence of false positives in which a door or window is determined to be open based on inaccuracy in the detection of magnetic fields.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
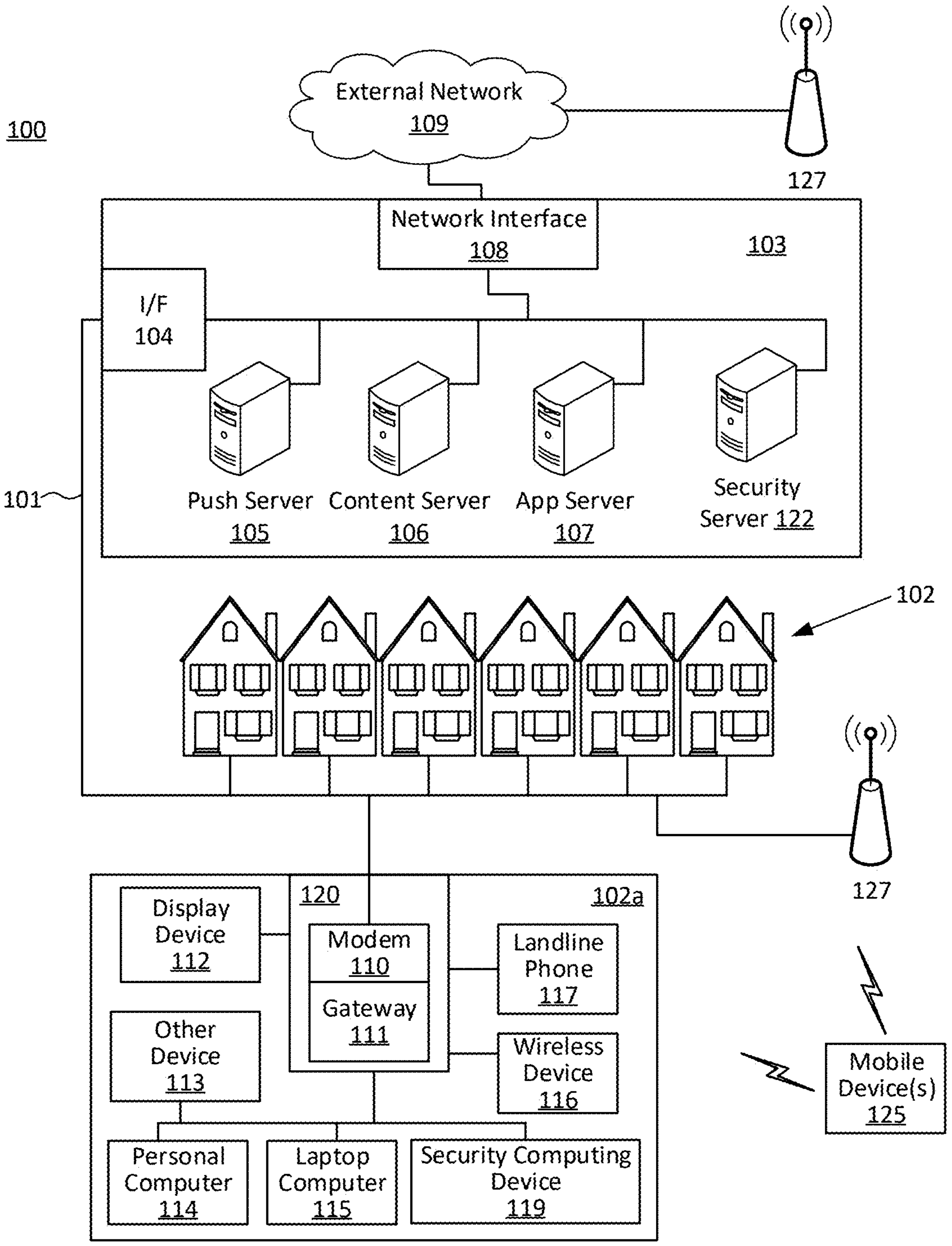
FIG. 1 shows an example communication network.

The accompanying drawings, which form a part hereof, show examples of the disclosure. It is to be understood that the examples shown in the drawings and/or described herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The one or more mobile devices 125 may comprise smart phones, tablets or laptop computers with wireless transceivers, tablets or laptop computers communicatively coupled to other devices with wireless transceivers, and/or any other type of device configured to communicate via a wireless network. For example, the one or more mobile devices 125 may comprise a smartphone that may be used to generate a user interface that indicates the state of a security system and/or one or more indications of the state of a window and/or door. The indications may be transmitted to the smartphone via the one or more external networks 109, using a connection that is established between the smartphone and one or more of the servers 105-107 and security server 122.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and security server 122, and/or to manage communications between those devices and one or more external networks 109. The security server 122 may implement ana security system that receives indications from devices (e.g., sensors that are configured to detect magnetic fields and may be attached to an object that may comprise a window and/or door) of premises 102. Further, the security server 122 may, based on processing the received data, generate indications (e.g., indications of the location of a magnet that may correspond to a configuration of an object (e.g., a door or window) being open or closed) and send the indications to the one or more mobile devices 125. For example, the security server 122 may send the indications to the one or more mobile devices 125 via the one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the one or more mobile devices 125 via the interface 108 and one or more of the external networks 109, e.g., via one or more of the wireless access points 127.

The push notification server 105 may be configured to generate push notifications to deliver information to devices in the premises 102 and/or to the one or more mobile devices 125. The content server 106 may be configured to provide content to devices in the premises 102 and/or to the one or more mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the one or more mobile devices 125. The local office 103 may comprise additional servers, such as the security server 122 (described below), additional push, content, and/or application servers, and/or other types of servers. Also or alternatively, one or more of the push server 105, the content server 106, the application server 107, and/or the security server 122 may be part of the external network 109 and may be configured to communicate (e.g., via the local office 103) with computing devices located in or otherwise associated with one or more premises 102. Although shown separately, the push server 105, the content server 106, the application server 107, the security server 122, and/or other server(s) may be combined. The servers 105, 106, 107, and security server 122, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), security computing device 119, and any other desired devices. The security computing device 119 may receive and/or process data from one or more sensors (e.g., the sensors 302-304, the sensors 402-404, and/or the sensors 502-504 that are described herein), communicate with the security server 122, perform operations of a security system, and/or perform operations of a premises automation system. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the one or more mobile devices 125, which may be on- or off-premises.

The one or more mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
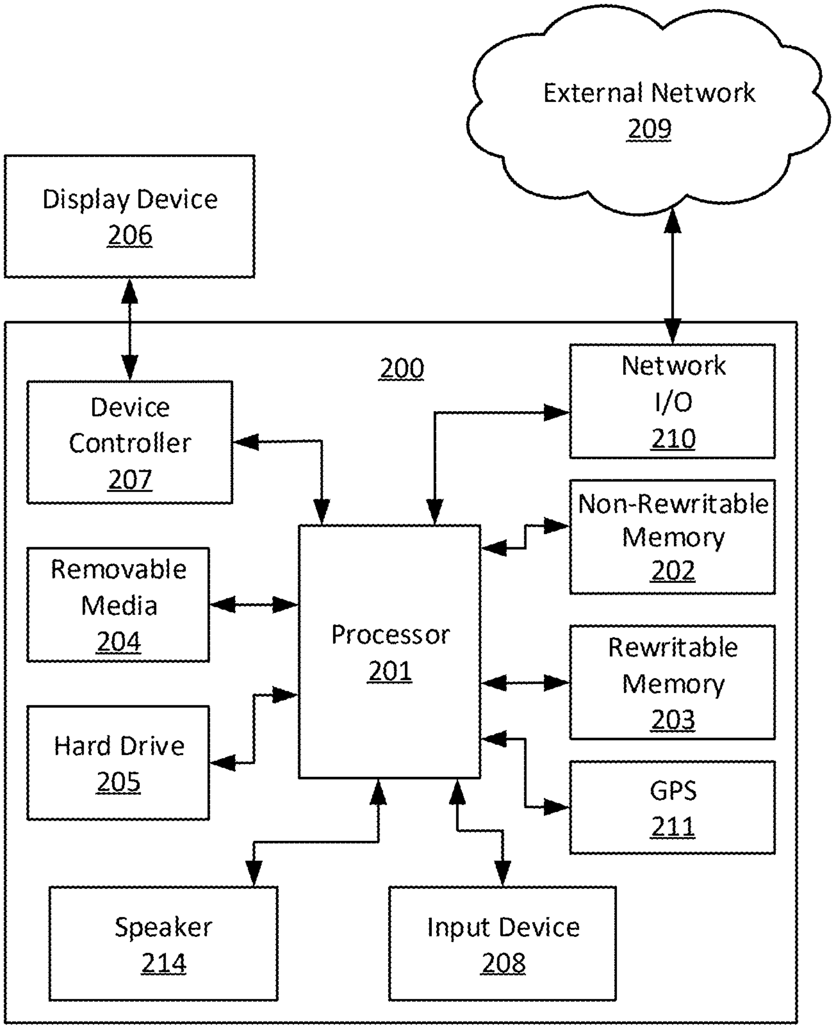
FIG. 2 shows hardware elements of a computing device.

FIG. 2 shows hardware elements of a computing device 200 that may be used to implement any of the computing devices shown in FIG. 1 (e.g., the one or more mobile devices 125, any of the devices shown in the premises 102*a*, any of the devices shown in the local office 103, any of the devices located in premises 102, the security computing device 119, the security server 122, any of the wireless access points 127, any devices with the external network 109) and any other computing devices described herein (e.g., the security server 122). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver.

The computing device 200 may comprise one or more user input devices 208. The one or more user input devices 208 may comprise a remote control, a keyboard, a mouse, a touch screen (which may be integrated with the display device 206), microphone, a camera, one or more buttons, etc. The computing device 200 may comprise one or more sensors. The one or more sensors may comprise a sensor (e.g., a Hall effect sensor or a reed switch) that is configured to detect magnetic fields and/or determine the strength of magnetic fields, a camera, a microphone, a motion sensor (e.g., an accelerometer), a thermal sensor, a heart rate sensor, and/or a tactile sensor. The computing device 200 may comprise a first sensor (e.g., the sensor 302, the sensor 402, and/or the sensor 502 that are described herein) and a second sensor (e.g., the sensor 304, the sensor 404, and/or the sensor 504 that are described herein). The first and second sensor may detect magnetic fields generated by a magnet (e.g., the magnet 306, the magnet 406, and/or the magnet 506 that are described herein). The first sensor and the second sensor may be offset from each other. The magnet may be configured to move relative to the first sensor and the second sensor and configured such that at least one of the first sensor or the second sensor can detect the magnetic field generated by the magnet regardless of null regions, as discussed below in FIGS. 3-5. For example, the first sensor may detect the magnetic field of the magnet even if the magnet is located in a null region of the second sensor in which the magnetic field of the magnet is not detectable by the second sensor. Additionally, the second sensor may detect the magnetic field of the magnet even if the magnet is located in a null region of the first sensor in which the magnetic field of the magnet is not detectable by the first sensor. The first or second sensor may detect a magnetic field of the magnet regardless of null regions in the magnetic field of the magnet.

The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 described above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
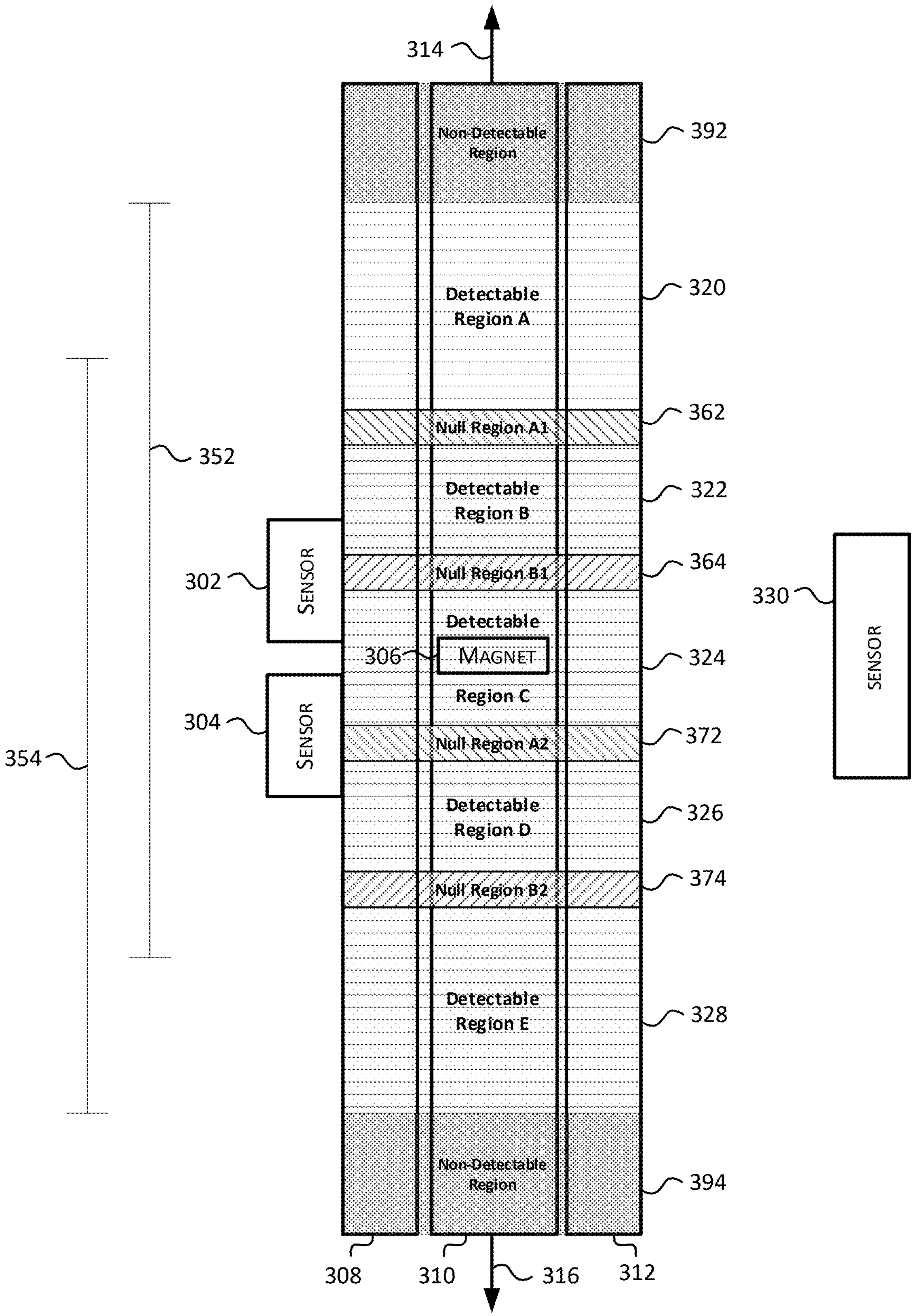
FIG. 3 shows a cross-sectional view of a configuration in which sensors are positioned on one side of a magnet.

FIG. 3 shows a cross-sectional view of a configuration in which sensors are positioned on one side of a magnet. Referring to FIG. 3, sensors 302-304 may comprise any type of sensor including, for example, a Hall effect sensor (Hall sensor) or reed switch. The sensors 302-304 may be configured to detect one or more magnetic fields that are generated by magnet 306. Based on the detection of one or more magnetic fields generated by the magnet 306, the sensors 302-304 may be configured to generate output comprising one or more indications that one or more magnetic fields were detected by the sensors 302-304. Sensors 302-304 may each have a sensor range. For example, sensor 302 may have a sensor range 352 and sensor 304 may have a sensor range 354. Sensor 302 may detect a magnetic field generated by the magnet 306 if the magnet 306 is within the sensor range 352 and if the magnet 306 is not within the null region A1 362 or null region A2 372. Sensor 304 may detect a magnetic field generated by the magnet 306 if the magnet 306 is within the sensor range 354 and if the magnet 306 is not within the null region B1 364 or null region B2 374. Further, each of the sensors 302-304 may comprise a computing device (e.g., a computing device comprising a processor, a memory, and/or a communications interface) and may be configured to send and/or receive data, send and/or receive instructions, and/or process data and/or instructions.

For example, the sensors 302-304 may be configured to send one or more indications (e.g., a first indication of whether a magnetic field is detected in a first detectable region and/or a second null region) to a computing device (e.g. the security computing device 119 and/or the security server 122).

For example, an indication that a magnetic field is detected may comprise a "1" to indicate that a magnetic field was detected. If a magnetic field is not detected, the sensors 302-304 may not generate an indication and/or generate an indication that is different from the indication that is generated when a magnetic field is detected (e.g., the sensors 302-304 may generate a "0" if a magnetic field is not detected and generate a "1" if a magnetic field is detected). The sensors 302-304 may comprise one or more switches that may be set to an open or closed state based on whether a magnetic field is detected. Further, the sensors 302-304 may comprise one or more single pole single throw (SPST) switches, one or more single pole double throw (SPDT) switches, one or more double pole single throw (DPST) switches, or one or more double pole double throw (DPDT) switches. For example, the sensor 302 may comprise a SPST switch that is set to an open state when a magnetic field is not detected and set to a closed state when a magnetic field is detected. Based on the SPST switch being in the closed state, the sensor 302 may cause a first indication that a magnetic field was detected to be generated and/or sent to a computing device (e.g., the security computing device 119 and/or the security server 122).

The sensors 302-304 may output an indication of the strength of a magnetic field that was detected by the sensors 302-304. For example, an indication of the strength of a detected magnetic field may comprise a numeric indication comprising values ranging from a lowest value (e.g., a value of zero) to a highest value (e.g., a value of one hundred), with a lowest value (e.g., a value of zero) indicating that no magnetic field was detected, a highest value (e.g., a value of one hundred) indicating a maximum strength of a magnetic field that the sensors 302-304 may be capable of detecting, and/or intermediate values (e.g., values between one and ninety-nine) corresponding to an increasingly strong magnetic field. Output of the measured strength of a magnetic field may comprise an indication of a measured amperes per meter (A/m), an indication of a measured magnetic flux density in Teslas (T), milliTeslas (mT), and/or webers per square meter ($Wb/m^2$). The one or more indications of the sensors 302-304 may be generated continuously (e.g., a continuous indication of a strength of a magnetic field), periodically (e.g., once per second or at a user determined frequency), or based on a request from another device (e.g., the sensors 302-304 may send an indication of a strength of a magnetic field based on a request from a computing device such as the security computing device 119 and/or the security server 122). Alternatively, the sensors 302-304 may remain in an idle state until a state change is signaled. For example, the sensors 302-304 may send an indication of a strength of a magnetic field when a state change (e.g., a change from a closed position to an open position) is signaled. This may result in battery life saving.

The sensors 302-304 may be positioned on an object (e.g., a first object of premises 102*a*). As shown in FIG. 3, the sensors 302-304 may be attached to element 308 (e.g., a window frame or a door frame). Further, the magnet 306 may be positioned on another object (e.g., a second object of premises 102*a*). As shown in FIG. 3, the magnet 306 may be positioned (e.g., attached to) on the element 310 (e.g., a window or door), which may be configured to move (e.g., slide) in the direction 314 (e.g., upwards) or in the direction 316 (e.g., downwards) which is opposite the direction 314. The element 310 may be positioned between the element 308 and element 312 (e.g., another portion of a window frame or door frame). Movement of the element 310 may cause the magnet 306, which is attached to the element 310, to move in the same direction as the element 310. In FIG. 3, the element 310 is in a closed position and moving the element 310 and the magnet 306 in the direction 314 may cause the element 310 to open and move towards an open position. Moving the element 310 and the magnet 306 from an open position and in the direction 316 may cause the element 310 to move towards a closed position. The sensors 302-304 that are positioned on the element 308 may be positioned to detect the magnetic field generated by the magnet 306, which is positioned on the element 310. Further, a magnetic field generated by the magnet 306 and detected by the sensors 302-304 may be used to determine whether the element 310 is in an open position or a closed position.

For example, the sensors 302-304 may be positioned on the element 308 (e.g., a portion of a window frame). As shown in FIG. 3, the sensor 302 may not be in contact with the sensor 304. Further, the sensor 302 may be the same type of sensor as the sensor 304 or a different type of sensor from the sensor 304 and may be configured to more or less sensitive to a magnetic field than the sensor 304. The magnet 306 may be positioned on the element 310 (e.g., a sliding window) that is configured to slide from an open position to a closed position within the element 308 and the element 312 (e.g., another portion of the window frame that the element 308 is a part of). If the window is in an open position, the sensors 302-304 may not detect the magnetic field of the magnet 306 and generate an indication that the window is in the open position. If the window is in a closed position, the sensors 302-304 may generate an indication that the window is in a closed position. By way of further example, the sensor 302 may be positioned on the element 308 (e.g., a portion of a door frame) and the sensor 304 may be positioned on top of the sensor 302. Further, the sensor 304 may not be in contact with the element 308. The magnet 306 may be positioned on the element 310 (e.g., a sliding door) that is configured to slide from an open position to a closed position within the element 308 and the element 312 (e.g., another portion of the door frame that the element 308 is a part of). If the door is in an open position, the sensors 302-304 may detect the magnetic field of the magnet 306 and generate an indication that the door is in the open position. If the door is in a closed position, the sensors 302-304 may generate an indication that the door is in a closed position.

The sensor 302, the sensor 304, and/or the magnet 306 may be arranged in a configuration that allows the sensor 302 to detect magnetic fields of the magnet 306 when the magnetic field of the magnet 306 is not detectable by the sensor 304. Further, the sensor 302, the sensor 304, and/or the magnet 306 may be arranged in a configuration that allows the sensor 304 to detect magnetic fields of the magnet 306 when the magnetic field of the magnet 306 is not detectable by the sensor 302. The configuration of the sensor 302, the sensor 304, and/or the magnet 306 may comprise the relative positions of the sensor 302, the sensor 304, and/or the magnet 306. For example, the configuration of the sensor 302, the sensor 304, and the magnet 306 may comprise one or more distances between the sensor 302, the sensor 304, and/or the magnet 306. For example, a distance between the sensor 302 and the sensor 304 may be set up and/or modified (e.g., during installation) in order for the sensor 302 to detect magnetic fields of the magnet 306 when the magnet 306 is in a location (e.g., second null region B2 374 of the sensor 304) in which its magnetic fields are not detectable by the sensor 304 and for the sensor 304 to detect magnetic fields of the magnet 306 when the magnet 306 is in a location (e.g., first null region A1 362 of the sensor 302) in which its magnetic fields are not detectable by the sensor 302. Sensor 302 may not detect magnetic fields of the magnet 306 in null region A1 362 and null region A2 372. Sensor 304 may not detect magnetic fields of the magnet 306 in null region B1 364 and null region B2 374. Further, the configuration of the sensor 302, the sensor 304, and/or the magnet 306 may comprise one or more locations of the sensor 302, the sensor 304, and/or the magnet 306 relative to the element 308 and/or 312. For example, the locations of the sensor 302 and the sensor 304, and the magnet 306 relative to the element 308 and/or the element 312 may be set up and/or modified (e.g., during installation) in order for the sensor 304 to detect magnetic fields of the magnet 306 when the magnet 306 is in a location in which its magnetic fields are not detectable by the sensor 302 and for the sensor 302 to detect magnetic fields of the magnet 306 when the magnet 306 is in a location in which its magnetic fields are not detectable by the sensor 304.

The security computing device 119 and one or more sensors 330 may be used to determine a configuration (e.g., a configuration of the sensor 302, the sensor 304, and/or the magnet 306 with respect to the element 308 and/or the element 312) that allows the sensor 302 to detect magnetic fields of the magnet 306 when the magnet 306 is in a location in which its magnetic fields are not detectable by the sensor 304 and for the sensor 304 to detect magnetic fields of the magnet 306 when the magnet 306 is in a location in which its magnetic fields are not detectable by the sensor 302. For example, the one or more sensors 330 may comprise one or more mechanical sensors that may be used to determine one or more locations of the magnet 306. By way of further example, the one or more sensors 330 may comprise a camera system that is configured to detect one or more locations of the magnet 306. The one or more sensors 330 may be used to determine a plurality of locations of the magnet 306 that may be associated with a corresponding plurality of magnetic field strengths detected by the sensor 302 and/or the sensor 304.

Based on the plurality of locations of the magnet 306 detected by the one or more sensors 330 and the plurality of magnetic field strengths detected by the sensor 302 and/or the sensor 304, the security computing device 119 may determine a configuration of the sensor 302, the sensor 304, and/or the magnet 306 that results in the first detectable region 320, the second detectable region 322, the third detectable region 324, the fourth detectable region 326, the fifth detectable region 328, the first null region A1 362 of the sensor 302, the second null region A2 372 of the sensor 302, the first null region B1 364 of the sensor 304, the second null region B2 374 of the sensor 304, the first non-detectable region 392, and/or the second non-detectable region 394 described with respect to FIG. 3. Further, the security computing device 119 may generate indications indicating the configuration (e.g., placement) of the sensor 302, the sensor 304, and/or the magnet 306 that allows the sensor 302 to detect magnetic fields of the magnet 306 when the magnet 306 is in a location in which its magnetic fields are not detectable by the sensor 304 (e.g., null region B1 364 and/or null region B2 374) and for the sensor 304 to detect magnetic fields of the magnet 306 when the magnet 306 is in a location in which its magnetic fields are not detectable by the sensor 302 (e.g., null region A1 362 and/or null region A2 372).

Modifying the configuration of the sensor 302 and/or the sensor 304 may comprise modifying a sensitivity to a magnetic field of the sensor 302 and/or the sensor 304. The sensitivity of the sensor 302 and/or the sensor 304 may be modified so that the sensor 302 detects magnetic fields if the magnet 306 is in the first null region B1 364 or second null region B2 374 and the sensor 304 detects magnetic fields if the magnet 306 is in the first null region A1 362 or second null region A2 372. For example, a sensitivity of the sensor 302 may be increased in order to improve detection of a magnetic field generated by the magnet 306 when the magnet 306 is located in the first null region B1 364 or second null region B2 374. Further, a sensitivity of the sensor 304 may be increased in order to improve detection of a magnetic field generated by the magnet 306 when the magnet 306 is located in the first null region A1 362 or second null region A2 372.

Further, modifying the configuration of the sensor 302 or the sensor 304 may comprise modifying one or more positions of the sensor 302 and/or the sensor 304. For example, one or more positions of the sensor 302, the sensor 304, and/or the magnet 306 may be modified based on one or more indications generated by the security computing device 119. The position of the sensor 302 and/or the sensor 304 may be modified so that the sensor 302 detects magnetic fields if the magnet 306 is in the first null region B1 364 or second null region B2 374 and the sensor 304 detects magnetic fields if the magnet 306 is in first null region A1 362 or second null region A2 372. Further, the sensor 302 and/or the sensor 304 may be positioned at different angles with respect to the element 308 and/or the element 312. For example, the sensor 302 and/or the sensor 304 may be moved to different locations (e.g., different locations on the element 308 and/or the element 312) and/or positioned in different angles in order to change the strength of the magnetic field that is detected by the sensor 302 and/or the sensor 304 when the magnet 306 is positioned on different portions of the element 308 and/or the element 312.

In FIG. 3, the sensor 302 and the sensor 304 are attached to the element 308. The sensor 302 may be positioned next to the sensor 304. The distance between the sensor 302 and the sensor 304 may be modified and the sensor 302 may be configured to be in contact with the sensor 304. Further, the sensor 302 and the sensor 304 may be positioned on the element 308 with a space between the sensor 302 and the sensor 304. The sensor 302 and/or the sensor 304 may detect magnetic fields in detectable regions 320, 322, 324, 326, and 328. Detectable regions may comprise regions in which the sensitivity of the sensor is high enough to detect the strength of a magnetic field in the region, the magnet is close enough to the sensor such that the sensor is able to detect the magnetic field generated by the magnet, and/or regions in which there is no obstruction between the detectable region and a magnet that generates a magnetic.

Further, the sensor 302 and/or the sensor 304 may not detect magnetic fields in null regions (e.g., null region A1 362, null region A2 372, null region B1 364, and null region B2 374) in which the magnetic field is not detectable by the sensor 302 and/or the sensor 304. For example, a region near the middle of a magnet (e.g., a region at the midpoint between the poles of the magnet) may generate a magnetic field that is weaker than the magnetic field at the poles of the magnet. Sensors (e.g., the sensors 302-304) that are able to detect a magnetic field generated by the poles of a magnet may not be able to detect the magnetic field at the null regions (or null point) of the magnet. For example, a reed switch may be incapable of detecting two null regions of a magnetic field generated by a magnet. Further, a Hall effect sensor may be incapable of detecting one null region in a magnetic field of a magnetic field generated by magnet. Moving the sensor 302 and/or the sensor 304 may result in the first detectable region 320, the second detectable region 322, the third detectable region 324, the fourth detectable region 326, the fifth detectable region 328, the first null region A1 362 of the sensor 302, the second null region A2 372 of the sensor 302, the first null region B1 364 of the sensor 304, the second null region B2 374 of the sensor 304, the first non-detectable region 392, and/or the second non-detectable region 394 changing.

The element 310 and the magnet 306 may be determined to be in a closed position if either or both of the sensors 302-304 detect the magnetic field generated by the magnet 306. The element 310 and the magnet 306 may be determined to be in an open position if both of the sensors 302-304 do not detect the magnetic field generated by the magnet 306. As shown in FIG. 3, the magnet 306 is located in the detectable region C 324, in which the sensors 302-304 may detect a magnetic field generated by the magnet 306. As shown in FIG. 3, the magnet 306 is in the detectable region C 324 in which both of the sensors 302-304 may detect the magnetic field generated by the magnet 306. The element 310 and magnet 306 may be determined to be in a closed position if the sensors 302-304 detect the magnetic field generated by the magnet 306 in the detectable region C 324.

If the element 310 and the magnet 306 are moved in the direction 314, the magnet 306 may enter the detectable region A 320 or the detectable region B 322 in which the sensors 302-304 may detect a magnetic field generated by the magnet 306. The magnet 306 may also enter non-detectable region 392 if the element 310 is moved further in the direction 314, in which the sensors 302-304 may not detect a magnetic field generated by the magnet 306. The element 310 and magnet 306 may be determined to be in a closed position if the sensors 302-304 detect a magnetic field generated by the magnet 306 in the detectable region A 320 or detectable region B 322. The element 310 and magnet 306 may be determined to be in an open position if the sensors 302-304 do not detect a magnetic field generated by the magnet 306 in the detectable region A 320 or detectable region B 322 when the element 310 and magnet 306 are moved in the direction 314.

Further, if the magnet 306 is in the first null region A1 362 of the sensor 302, the magnet 306 may not be detected by the sensor 302 but may be detected by the sensor 304. In this situation, sensor 302 may not sense the magnetic field generated by the magnet 306 since the magnet 306 is in the null region A1 362 of sensor 302. However, sensor 304 may sense the magnetic field generated by the magnet 306 since the magnet 306 is within the sensor range 354 of sensor 304 if the magnet is in the null region A1 362. If the magnet 306 is in the first null region A1 362 of the sensor 302, the magnet 306 may be detected by the sensor 304 and the element 310 and the magnet 306 may be determined to be in a closed position. In this scenario, a false negative may be avoided since the sensor 302 may not detect the magnetic field generated by the magnet 306 and the sensor 304 may detect the magnetic field generated by the magnet 306 when the magnet 306 is moved to the first null region A1 362 of the sensor 302. Similarly, if the magnet 306 is in the first null region B1 364 of the sensor 304, the magnet 306 may not be detected by the sensor 304 but may be detected by the sensor 302. In this situation, sensor 304 may not sense the magnetic field generated by the magnet 306 since the magnet 306 is in the null region B1 364 of sensor 304. However, sensor 302 may sense the magnetic field generated by the magnet 306 since the magnet 306 is within the sensor range 352 of sensor 302 if the magnet is in the null region B1 364. If the magnet 306 is in the first null region B1 364 of the sensor 304, the magnet 306 may be detected by the sensor 302 and the element 310 and the magnet 306 may be determined to be in a closed position. In this scenario, a false negative may also be avoided since the sensor 304 may not detect the magnetic field generated by the magnet 306 and the sensor 302 may detect the magnetic field generated by the magnet 306 when the magnet 306 is moved to the first null region B1 364 of the sensor 304.

If the element 310 and the magnet 306 are moved in the direction 316, the magnet 306 may enter the detectable region D 326 or the detectable region E 328 in which the sensors 302-304 may detect a magnetic field generated by the magnet 306. The magnet 306 may also enter non-detectable region 394 if the element 310 is moved further in the direction 314, in which the sensors 302-304 may not detect a magnetic field generated by the magnet 306. The element 310 and magnet 306 may be determined to be in a closed position if the sensors 302-304 detect a magnetic field generated by the magnet 306 in the detectable region D 326 or detectable region E 328. The element 310 and magnet 306 may be determined to be in an open position if the sensors 302-304 do not detect a magnetic field generated by the magnet 306 in the detectable region D 326 or detectable region E 328 when the element 310 and magnet 306 are moved in the direction 314.

Further, if the magnet 306 is in the second null region A2 372 of the sensor 302, the magnet 306 may not be detected by the sensor 302 but may be detected by the sensor 304. In this situation, sensor 302 may not sense the magnetic field generated by the magnet 306 since the magnet 306 is in the null region A2 372 of sensor 302. However, sensor 304 may sense the magnetic field generated by the magnet 306 since the magnet 306 is within the sensor range 354 of sensor 304 if the magnet is in the null region A2 372. If the magnet 306 is in the second null region A2 372 of the sensor 302, the magnet 306 may be detected by the sensor 304 and the element 310 and the magnet 306 may be determined to be in a closed position. In this scenario, a false negative may be avoided since the sensor 302 may not detect the magnetic field generated by the magnet 306 and the sensor 304 may detect the magnetic field generated by the magnet 306 when the magnet 306 is moved to the second null region A2 372 of the sensor 302. Similarly, if the magnet 306 is in the second null region B2 374 of the sensor 304, the magnet 306 may not be detected by the sensor 304 but may be detected by the sensor 302. In this situation, sensor 304 may not sense the magnetic field generated by the magnet 306 since the magnet 306 is in the null region B2 374 of sensor 304. However, sensor 302 may sense the magnetic field generated by the magnet 306 since the magnet 306 is within the sensor range 352 of sensor 302 if the magnet is in the null region B2 374. If the magnet 306 is in the second null region B2 374 of the sensor 304, the magnet 306 may be detected by the sensor 302 and the element 310 and the magnet 306 may be determined to be in a closed position. In this scenario, a false negative may also be avoided since the sensor 304 may not detect the magnetic field generated by the magnet 306 and the sensor 302 may detect the magnetic field generated by the magnet 306 when the magnet 306 is moved to the second null region B2 374 of the sensor 304.

A computing device (e.g., the security computing device 119 and/or the security server 122) may be configured to determine whether the element 310 (e.g., a door or window) is in an open or closed position based on output from the sensors 302-304. For example, a computing device may be configured to determine that the element 310 is in an open position if a) the sensor 302 indicates that the magnet 306 is in the first non-detectable region 392 and the sensor 304 indicates that the magnet 306 is in the first non-detectable region 392, or b) the sensor the sensor 304 indicates that the magnet 306 is in the second non-detectable region 394 and the sensor 304 indicates that the magnet 306 is in the second non-detectable region 394. Further, a computing device may be configured to determine that the element 310 is in a closed position if a) the sensor 302 indicates that the magnet 306 is in detectable region A 320, detectable region B 322, detectable region C 324, detectable region D 326, detectable region E 328, null region B1 364, or null region B2 374, or b) the sensor 304 indicates that the magnet 306 is in detectable region A 320, detectable region B 322, detectable region C 324, detectable region D 326, detectable region E 328, null region A1 362, or null region A2 372.

The sensors 302-304 may comprise or be configured to communicate with a computing device (e.g., the security computing device 119 and/or the security server 122) that comprises one or more processors and a memory. The sensors 302-304 may comprise a communications interface that may be used to communicate with another device (e.g., the security computing device 119 and/or the security server 122) via a wired connection and/or wirelessly. For example, the sensors 302-304 may send indications that a magnetic field is detected and/or indications of the strength of a detected magnetic field to another device (e.g., the security computing device 119 and/or the security server 122) via a wire connecting the sensors 302-304 to another device. By way of further example, the sensors 302-304 may be configured to wirelessly send indications that a magnetic field is detected and/or indications of the strength of a magnetic field to another device (e.g., the security computing device 119 and/or the security server 122). The sensors 302-304 may be configured to send indications that a magnetic field is detected and/or indications of the strength of a magnetic field via a gateway device (e.g., the gateway 111). For example, the sensors 302-304 may send indications of the strength of a magnetic field to security server 122 via gateway 111. The computing device that receives indications sent from the sensors 302-304 may be located within the same premises as the sensors 302-304 (e.g., located within the same house or office as the sensors 302-304) and/or may be located at a remote location (e.g., located at a security office that is not in the same house or office as the sensors 302-304).

Figure 4:
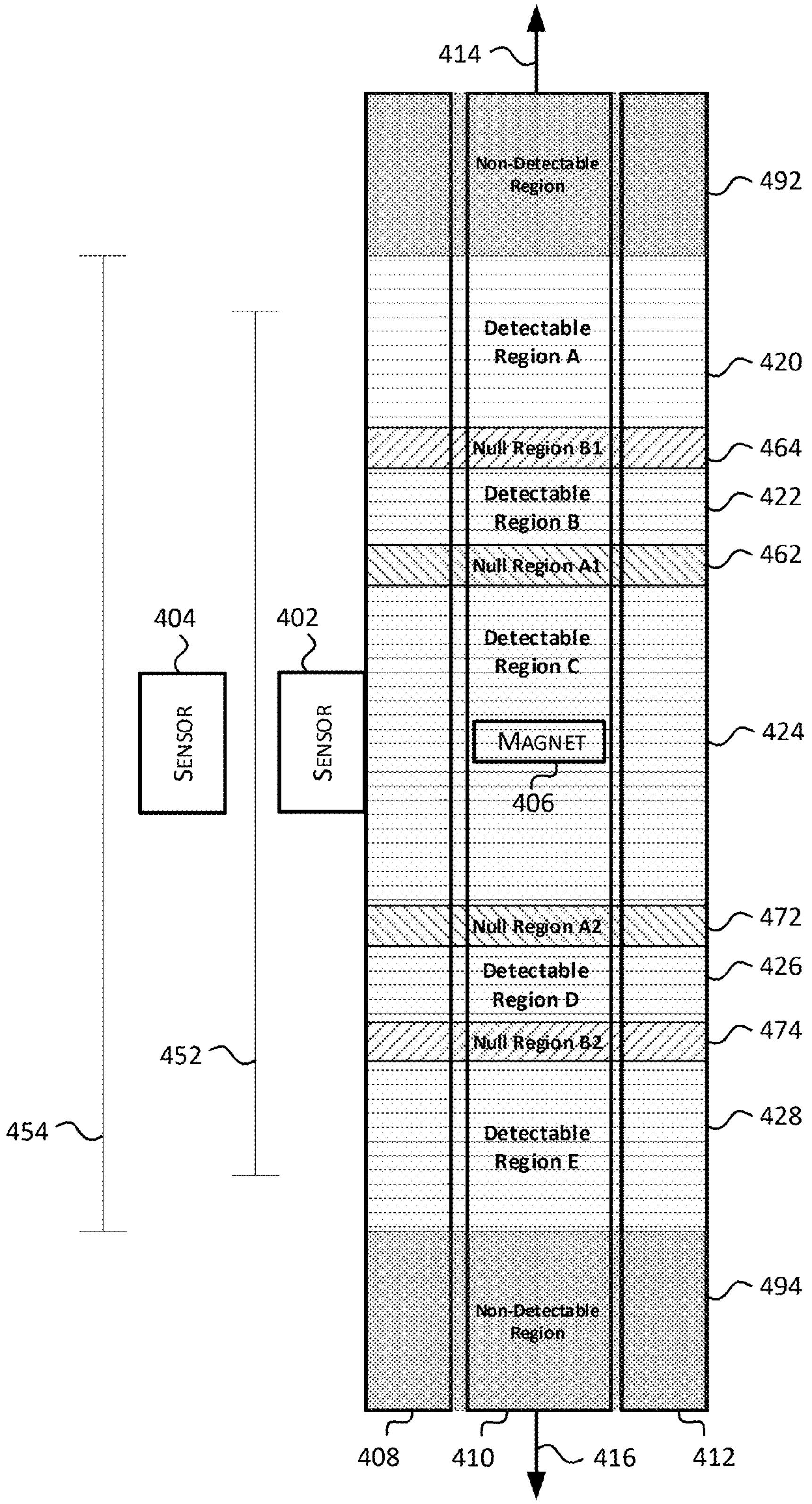
FIG. 4 shows a cross-sectional view of a configuration in which sensors are stacked and positioned on one side of a magnet.

FIG. 4 shows a cross-sectional view of a configuration in which sensors are stacked and positioned on one side of a magnet. Referring to FIG. 4, sensors 402-404 may comprise any type of sensor including, for example, a Hall effect sensor (Hall sensor) or reed switch. The sensors 402-404 may be configured to detect one or more magnetic fields that are generated by magnet 406. Based on the detection of one or more magnetic fields generated by the magnet 406, the sensors 402-404 may be configured to generate output comprising one or more indications that one or more magnetic fields were detected by the sensors 402-404. Sensors 402-404 may each have a sensor range. For example, sensor 402 may have a sensor range 452 and sensor 404 may have a sensor range 454. Sensor 402 may detect a magnetic field generated by the magnet 406 if the magnet 406 is within the sensor range 452 and if the magnet 406 is not within the null region A1 462 or null region A2 472. Sensor 404 may detect a magnetic field generated by the magnet 406 if the magnet 406 is within the sensor range 454 and if the magnet 406 is not within the null region B1 464 or null region B2 474. The sensors 402-404 may comprise features and/or capabilities of one or more sensors described herein including the sensors 302-304 which are described with respect to FIG. 3. For example, each of the sensors 402-404 may comprise a computing device (e.g., a computing device comprising a processor, a memory, and/or a communications interface) and may be configured to send and/or receive data, send and/or receive instructions, and/or process data and/or instructions. For example, the sensors 402-404 may be configured to send one or more indications (e.g., a second indication of whether a magnetic field is detected in a first detectable region and/or a first null region) to a computing device (e.g. the security computing device 119 and/or the security server 122).

The sensors 402-404 may be positioned on an object (e.g., a first object of the premises 102*a*). As shown in FIG. 4, the sensor 402 may be attached to element 408 (e.g., a window frame or a door frame). Further, the sensor 402 may be in contact with (e.g., the sensor 402 may be stacked on top of the sensor 404) and/or attached to the sensor 404. There may be a distance between the sensor 402 and the sensor 404 and/or another object may be between the sensor 402 and the sensor 404. The sensor 404 may be configured to detect the magnet 406 through the sensor 402. The magnet 406 may generate a magnetic field that may be detected by the sensors 402-404, and may be positioned on another object (e.g., a second object of the premises 102*a*). As shown in FIG. 4, the magnet 406 may be positioned (e.g., attached) on element 410 (e.g., a window or door), which may be configured to move (e.g., slide) in direction 414 (e.g., upwards) or direction 416 (e.g., downwards). The element 410 may be positioned between the element 408 and element 412. Movement of the element 410 may cause the magnet 406, which is attached to the element 410, to move in the same direction as the element 410. In this example, the element 410 is in a closed position and moving the element 410 and the magnet 406 in the direction 414 may cause the element 410 to move towards an open position. Moving the element 410 and the magnet 406 from an open position and in the direction 416 may cause the element 410 to move towards a closed position. The sensors 402-404 on the element 408 may be positioned to detect the magnetic field generated by the magnet 406, which is positioned on the element 410. Further, a magnetic field generated by the magnet 406 and detected by the sensors 402-404 may be used to determine whether the element 410 is in an open position or a closed position.

In FIG. 4, the sensor 402 and the sensor 404 may be attached to the element 408. The sensor 402 may be positioned offset to the sensor 404. The distance between the sensor 402 and the sensor 404 may be modified and the sensor 402 may be configured to be in contact with the sensor 404. Further, the sensor 402 and the sensor 404 may be positioned on the element 408 with a space between the sensor 402 and the sensor 404. As shown in FIG. 4, the magnet 406 is in the detectable region C 424 in which both of the sensors 402-404 may detect the magnetic field generated by the magnet 406. The element 410 and magnet 406 may be determined to be in a closed position if the sensors 402-404 detect the magnetic field generated by the magnet 406 in the detectable region C 424.

If the element 410 and the magnet 406 are moved in the direction 414, the magnet 406 may enter detectable region A 420 or detectable region B 422 in which the sensor 402-404 may detect a magnetic field generated by the magnet 406. The magnet 406 may also enter the null region A1 462 of the sensor 402 in which the sensor 402 may not detect the magnetic field generated by the magnet 406 but the sensor 404 may detect the magnetic field generated by the magnet 406. The magnet 406 may also enter the null region B1 464 of the sensor 404 in which the sensor 404 may not detect the magnetic field generated by the magnet 406 but the sensor 402 may detect the magnetic field generated by the magnet 406. The magnet 406 may also enter non-detectable region 492 if the element 410 is moved further in the direction 414, in which the sensors 402-404 may not detect the magnetic field generated by the magnet 406.

The element 410 and magnet 406 may be determined to be in a closed position if either of the sensors 402-404 detect the magnetic field generated by the magnet 406 in the detectable region A 420, detectable region B 422, null region A1 462 (by sensor 404), or null region B1 464 (by sensor 402). The element 410 and magnet 406 may be determined to be in an open position if both the sensors 402-404 do not detect a magnetic field generated by the magnet 406 in the detectable region A 420, the detectable region B 422, the null region A1 462, or the null region B1 464 when the element 410 and magnet 406 are moved in the direction 416. The element 410 and magnet 406 may be determined to be in an open position if the magnet 406 is in the non-detectable region 492.

If the element 410 and the magnet 406 are moved in the direction 416, the magnet 406 may enter detectable region D 426 or detectable region E 428 in which the sensor 402-404 may detect a magnetic field generated by the magnet 406. The magnet 406 may also enter the null region A2 472 of the sensor 402 in which the sensor 402 may not detect the magnetic field generated by the magnet 406 but the sensor 404 may detect the magnetic field generated by the magnet 406. The magnet 406 may also enter the null region B2 474 of the sensor 404 in which the sensor 404 may not detect the magnetic field generated by the magnet 406 but the sensor 402 may detect the magnetic field generated by the magnet 406. The magnet 406 may also enter non-detectable region 494 if the element 410 is moved further in the direction 416, in which the sensors 402-404 may not detect the magnetic field generated by the magnet 406.

The element 410 and magnet 406 may be determined to be in a closed position if either of the sensors 402-404 detect the magnetic field generated by the magnet 406 in the detectable region D 426, detectable region E 428, null region A2 472 (by sensor 404), or null region B2 474 (by sensor 402). The element 410 and magnet 406 may be determined to be in an open position if both the sensors 402-404 do not detect a magnetic field generated by the magnet 406 in the detectable region D 426, the detectable region E 428, the null region A2 472, or the null region B2 474 when the element 410 and magnet 406 are moved in the direction 416. The element 410 and magnet 406 may be determined to be in an open position if the magnet 406 is in the non-detectable region 494.

The sensors 402-404 may be configured to communicate with a computing device (e.g., the security computing device 119 and/or the security server 122) that comprises one or more processors and a memory. The sensors 402-404 may comprise a communications interface that may be used to communicate with another device (e.g., the security computing device 119 and/or the security server 122) via a wired connection and/or wirelessly.

Figure 5:
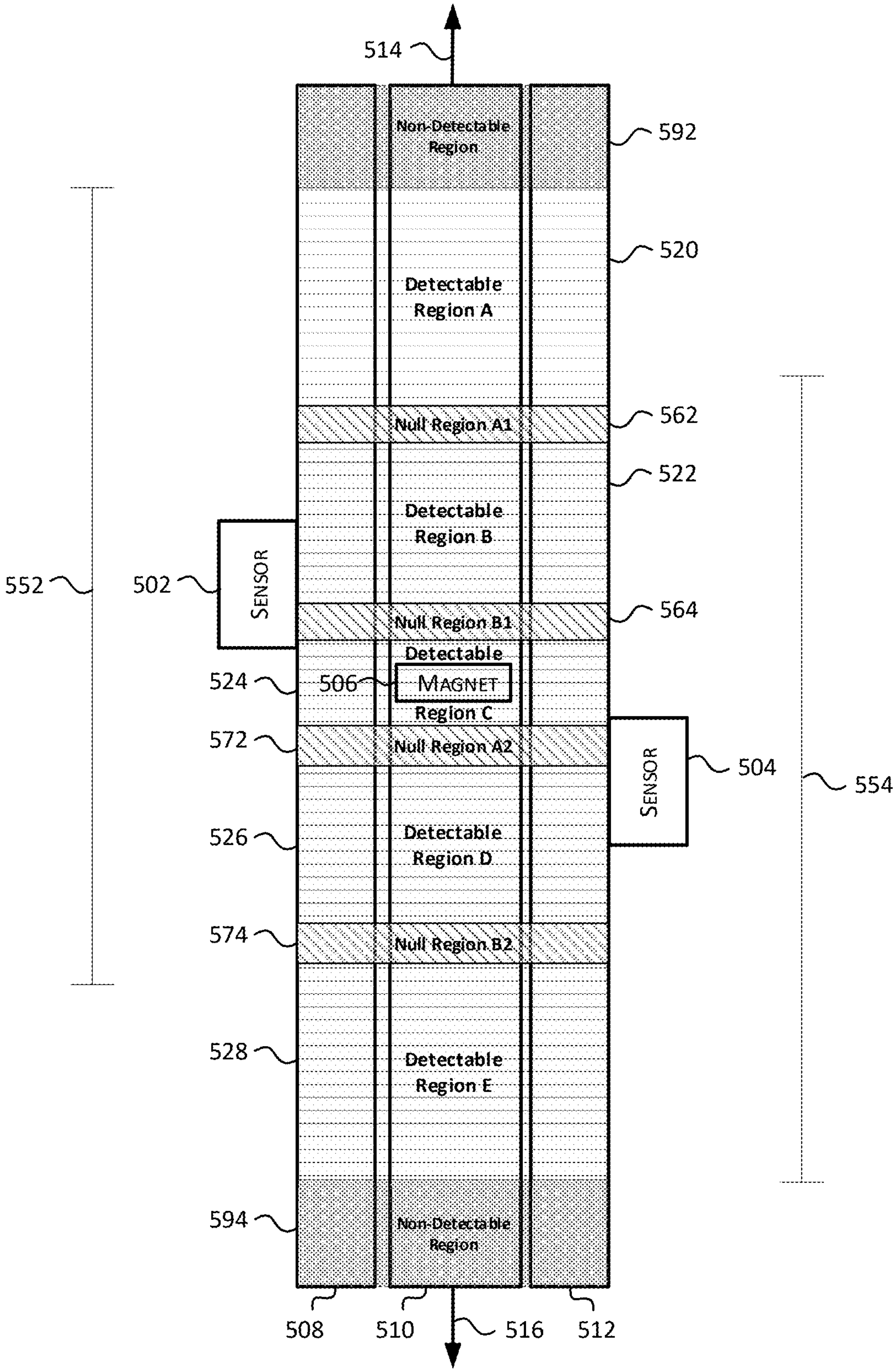
FIG. 5 shows a cross-sectional view of a configuration in which sensors are positioned on opposite sides of a magnet.

FIG. 5 shows a cross-sectional view of a configuration in which sensors are positioned on opposite sides of a magnet. Referring to FIG. 5, sensors 502-504 may comprise any type of sensor including, for example, a Hall effect sensor (Hall sensor) or reed switch. The sensors 502-504 may be configured to detect one or more magnetic fields that are generated by magnet 506. Further, based on the detection of one or more magnetic fields generated by the magnet 506, the sensors 502-504 may be configured to generate output comprising one or more indications that one or more magnetic fields were detected by the sensors 502-504. Sensors 502-504 may each have a sensor range. For example, sensor 502 may have a sensor range 552 and sensor 504 may have a sensor range 554. Sensor 502 may detect a magnetic field generated by the magnet 506 if the magnet 506 is within the sensor range 552 and if the magnet 506 is not within the null region A1 562 or null region A2 572. Sensor 504 may detect a magnetic field generated by the magnet 506 if the magnet 506 is within the sensor range 554 and if the magnet 506 is not within the null region B1 564 or null region B2 574. Further, the sensors 502-504 may comprise features and/or capabilities of one or more sensors described herein including the sensors 302-304 which are described with respect to FIG. 3. For example, each of the sensors 502-504 may comprise a computing device (e.g., a computing device comprising a processor, a memory, and/or a communications interface) and may be configured to send and/or receive data, send and/or receive instructions, and/or process data and/or instructions. For example, the sensors 502-504 may be configured to send one or more indications (e.g., a second indication of whether a magnetic field is detected in a first detectable region and/or a first null region) to a computing device (e.g. the security computing device 119 and/or the security server 122).

The sensors 502-504 may be positioned on an object (e.g., a first object of premises **102*a*). As shown in FIG. 5, the sensor 502 may be attached to element 508 (e.g., a window frame or a door frame) and the sensor 504 may be attached to element 512. Further, the magnet 506 may generate a magnetic field that may be detected by the sensors 502-504 and may be attached to element 510 (e.g., a window or door), which may be configured to move (e.g., slide or swing) in direction 514 (e.g., upwards) or direction 516 (e.g., downwards). Positioning the sensor 502 and the sensor 504 on opposite sides of the magnet 506 may improve detection, by the sensor 502 and/or the sensor 504, of a magnetic field generated by the magnet 506. For example, if the sensor 502 generates electrical emissions that interfere with the sensor 504 and/or the sensor 504 generates electrical emissions that interfere with the sensor 502, placing the sensors 502-504 on opposite sides of the magnet 506 may result in improved detection of the magnetic field generated by the magnet 506. The element 510 may be positioned between the element 508 and the element 512. Movement of the element 510 may cause the magnet 506, which is attached to the element 510, to move in the same direction as the element 510. In this example, the element 510 is in a closed position and moving the element 510 and the magnet 506 in the direction 514 may cause the element 510 to move towards an open position. Moving the element 510 and the magnet 506 from an open position and in the direction 516 may cause the element 510 to move towards a closed position. The sensors 502-504 on the element 508 may be positioned to detect the magnetic field generated by the magnet 506, which is positioned on the element 510**.

Further, a magnetic field generated by the magnet 506 and detected by the sensors 502-504 may be used to determine whether the element 510 is in an open position or a closed position.

For example, the sensors 502-504 may be positioned on a window frame and magnet 506 may be positioned on a sliding window that is configured to slide from an open position to a closed position within the window frame. If the window is in an open position, the sensors 502-504 may detect the magnetic field of the magnet and generate an indication that the window is in the open position. If the window is in a closed position, the sensors 502-504 may generate an indication that the window is in a closed position.

In FIG. 5, the sensor 502 may be attached to the element 508 and the sensor 504 may be attached to the element 512. The sensor 502 may be positioned directly opposite the sensor 504 or offset from the sensor 504 as shown in FIG. 5. The distance between the sensor 502 and the sensor 504 may be modified. For example, the sensor 502 and/or the sensor 504 may be moved in order to increase or decrease the distance between the sensor 502 and the sensor 504. Moving the sensor 502 and/or the sensor 504 may result in the detectable region A 520, the detectable region B 522, the detectable region C 524, the detectable region D 526, the detectable region E 528, the null region A1 562 of the sensor 502, the null region A2 572 of the sensor 502, the null region B1 564 of the sensor 504, the null region B2 574 of the sensor 504, the first non-detectable region 592, and/or the second non-detectable region 594 changing. As shown in FIG. 5, the magnet 506 is in the detectable region C 524 in which both of the sensors 502-504 may detect the magnetic field generated by the magnet 506. The element 510 and magnet 506 may be determined to be in a closed position if the sensors 502-504 detect the magnetic field generated by the magnet 506 in the detectable region C 524

If the element 510 and the magnet 506 are moved in direction 514, the magnet 506 may enter detectable region A 520 or detectable region B 522 in which the sensors 502-504 may detect a magnetic field generated by the magnet 506. The magnet 506 may also enter the null region A1 562 of the sensor 502 in which the sensor 502 may not detect the magnetic field generated by the magnet 506 but the sensor 504 may detect the magnetic field generated by the magnet 506. The magnet 506 may also enter the null region B1 564 of the sensor 504 in which the sensor 504 may not detect the magnetic field generated by the magnet 506 but the sensor 502 may detect the magnetic field generated by the magnet 506. The magnet 506 may also enter non-detectable region 592 if the element 510 is moved further in the direction 514, in which the sensors 502-504 may not detect the magnetic field generated by the magnet 506.

The element 510 and magnet 506 may be determined to be in a closed position if either of the sensors 502-504 detect the magnetic field generated by the magnet 506 in the detectable region A 520, detectable region B 522, null region A1 562 (by sensor 504), or null region B1 564 (by sensor 502). The element 510 and magnet 506 may be determined to be in an open position if both the sensors 502-504 do not detect a magnetic field generated by the magnet 506 in the detectable region A 520, the detectable region B 522, the null region A1 562, or the null region B1 564 when the element 510 and magnet 506 are moved in the direction 516. The element 510 and magnet 506 may be determined to be in an open position if the magnet 506 is in the non-detectable region 592.

If the element 510 and the magnet 506 are moved in the direction 516, the magnet 506 may enter detectable region D 526 or detectable region E 528 in which the sensor 502-504 may detect the magnetic field generated by the magnet 506. The magnet 506 may also enter the null region A2 572 of the sensor 502 in which the sensor 502 may not detect the magnetic field generated by the magnet 506 but the sensor 504 may detect the magnetic field generated by the magnet 506. The magnet 506 may also enter the null region B2 574 of the sensor 504 in which the sensor 504 may not detect the magnetic field generated by the magnet 506 but the sensor 502 may detect the magnetic field generated by the magnet 506. The magnet 506 may also enter non-detectable region 594 if the element 510 is moved further in the direction 516, in which the sensors 502-504 may not detect the magnetic field generated by the magnet 506.

The element 510 and magnet 506 may be determined to be in a closed position if either of the sensors 502-504 detect the magnetic field generated by the magnet 506 in the detectable region D 526, detectable region E 528, null region A2 572 (by sensor 504), or null region B2 574 (by sensor 502). The element 510 and magnet 506 may be determined to be in an open position if both the sensors 502-504 do not detect a magnetic field generated by the magnet 506 in the detectable region D 526, the detectable region E 528, the null region A2 572, or the null region B2 574 when the element 510 and magnet 506 are moved in the direction 516. The element 510 and magnet 506 may be determined to be in an open position if the magnet 506 is in the non-detectable region 594.

The sensors 502-504 may comprise or be configured to communicate with a computing device (e.g., the security computing device 119 and/or the security server 122) that comprises one or more processors and a memory. The sensors 502-504 may comprise a communications interface that may be used to communicate with another device (e.g., the security computing device 119 and/or the security server 122) via a wired connection and/or wirelessly.

Figure 6:
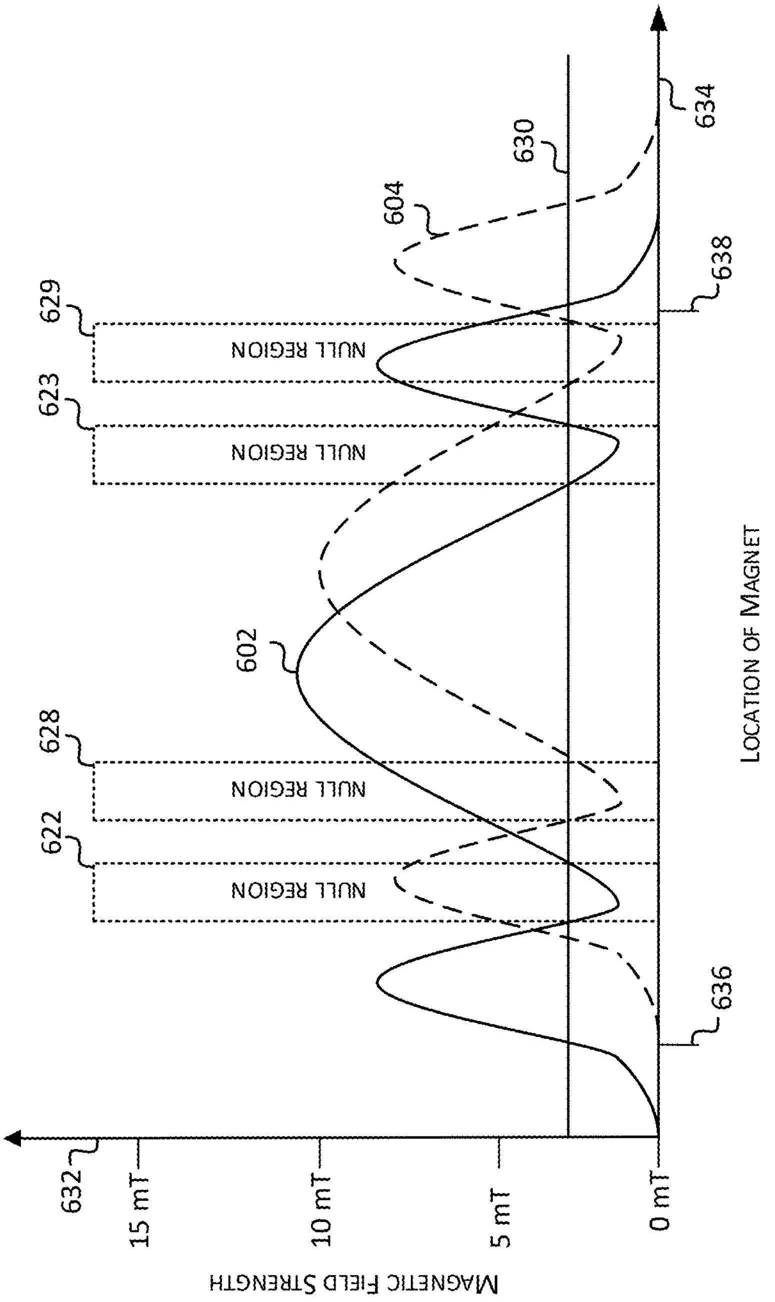
FIG. 6 shows a diagram of indications of magnetic field strength generated by sensors configured to detect magnetic fields of a magnet at different locations.

FIG. 6 shows a diagram of indications of magnetic field strength generated by sensors configured to detect magnetic fields of a magnet at different locations. The plurality of magnetic field strength indications 602 may be based on output from a first sensor (e.g., the sensor 302 described with respect to FIG. 3) that is configured to detect a magnetic field generated by a magnet (e.g., the magnet 306) at a plurality of locations corresponding to the plurality of magnet location indications 634 (e.g., a plurality of locations of a magnet attached to a door or window that is moved from a closed position to an open position). Further, the plurality of magnetic field strength indications 604 may be based on output from a second sensor (e.g., the sensor 304 described with respect to FIG. 3) that is configured to detect a magnetic field generated by a magnet (e.g., the magnet 306) at a plurality of locations corresponding to the plurality of magnet location indications 634 (e.g., a plurality of locations of a magnet attached to a door or window that is moved from a closed position to an open position).

The plurality of magnetic field strength indications 632 may indicate the magnetic field strength of the magnet detected by the sensors at each of a plurality of locations indicated by the plurality of magnet location indications 634. In this example, the magnetic field strength of the magnet indicated by the magnet location indication 636 may correspond to the magnet being in a position corresponding to an element (e.g., a door or window) being in a closed position. Further, the magnetic field strength of the magnet indicated by the magnet location indication 638 may correspond to the magnet being in a position corresponding to an element (e.g., a door or window) being in an open position.

When the magnet is in certain locations, the magnetic field strength may be below a threshold 630 that indicates the minimum magnetic field strength that the first sensor or the second sensor are able to detect. A magnetic field strength below the threshold 630 may not be detected by the first sensor or the second sensor. In this example, if the magnet is in null region 622 (e.g., the null region A1 362) or null region 623 (e.g., the null region A2 372), the magnetic field strength of the magnet may not be detected by the first sensor (e.g., the sensor 302) due to the magnetic field strength being below the threshold 630. Further, if the magnet is in null region 622 or null region 623, the magnetic field strength of the magnet may be detected by the second sensor (e.g., the sensor 304) due to the magnetic field strength being above the threshold 630. If the magnet is in null region 628 (e.g., the null region B1 364) or null region 629 (e.g., the null region B2 374), the magnetic field of the magnet may not be detected by the second sensor due to the magnetic field strength being below the threshold 630. Further, if the magnet is in null region 628 or null region 629, the magnetic field strength of the magnet may be detected by the first sensor due to the magnetic field strength being above the threshold 630. As a result of the configuration of the first sensor and the second sensor, the magnetic field strength of the magnet may be determined when the magnet is in a null region or not in a null region.

Figure 7:
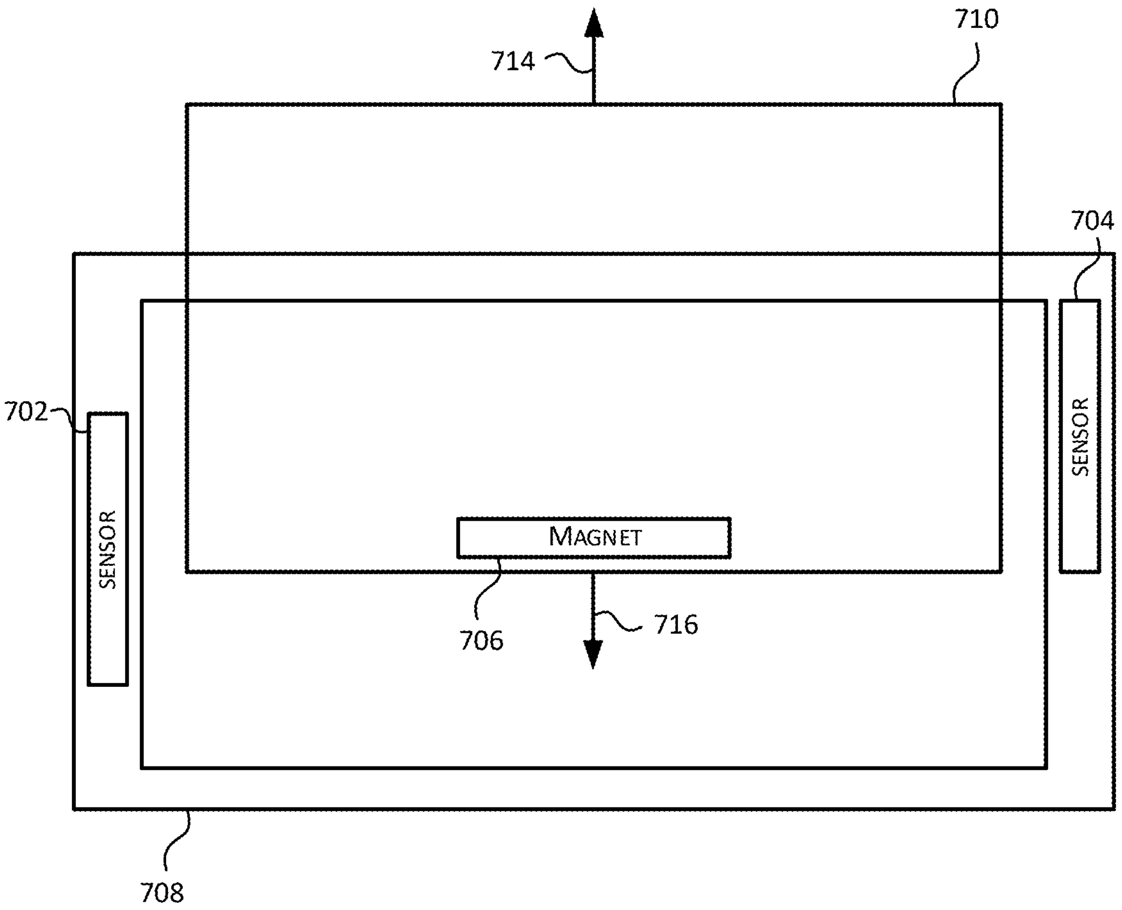
FIG. 7 shows a front view of a configuration in which sensors are positioned to detect magnetic fields generated by a magnet.

FIG. 7 shows a front view of a configuration in which sensors are positioned to detect magnetic fields generated by a magnet. Referring to FIG. 7, sensors 702-704 may comprise any type of sensor including, for example, a Hall effect sensor (Hall sensor) or reed switch. The sensors 702-704 may be configured to detect one or more magnetic fields that are generated by magnet 706. Further, based on the detection of one or more magnetic fields generated by the magnet 706, the sensors 702-704 may be configured to generate output comprising one or more indications that one or more magnetic fields were detected by the sensors 702-704. Further, the sensors 702-704 may comprise features and/or capabilities of one or more sensors described herein including the sensors 302-304 which are described with respect to FIG. 3. For example, each of the sensors 702-704 may comprise a computing device (e.g., a computing device comprising a processor, a memory, and/or a communications interface) and may be configured to send and/or receive data, send and/or receive instructions, and/or process data and/or instructions. For example, the sensors 702-704 may be configured to send one or more indications (e.g., a second indication of whether a magnetic field is detected in a first detectable region and/or a first null region) to a computing device (e.g. the security computing device 119 and/or the security server 122).

In FIG. 7, the magnet 706 may be attached to the element 710 (e.g., a door or window) that is configured to move from a closed position to an open position. A magnetic field of the magnet 706 may be detected by the sensor 702 that is attached to the element 708 (e.g., a door frame or window frame). As the magnet 706 is moved in the direction 714 or the direction 716, the strength of the magnetic field generated by the magnet 706 and detected by the sensor 702 and/or the sensor 704 may change. In this example, the element 710 and the attached magnet 706 is in an open position that is detected by the sensor 702 and the sensor 704. Based on outputs from the sensor 702 and/or the sensor 704, the position of the element 710 may be determined by a computing device (e.g., the security computing device 119) to be in the open position. As described herein, movement of the magnet 706 may cause the magnet to be located within a first null region (e.g., the null region B1 364 described with respect to FIG. 3) in which the magnetic field generated by the magnet 706 is not detected by the sensor 704 or a second null region (e.g., the null region A2 372 described with respect to FIG. 3) in which the magnetic field generated by the magnet 706 is not detected by the sensor 702. The determination that the element 710 is in the open position may cause a computing device (e.g., the security computing device 119) to generate an indication that the element 710 is in the open position and/or an indication that a security event has occurred. The computing device (e.g., the security computing device 119) may then send the indication of the security event to a user device (e.g., the mobile device 125).

Figure 8:
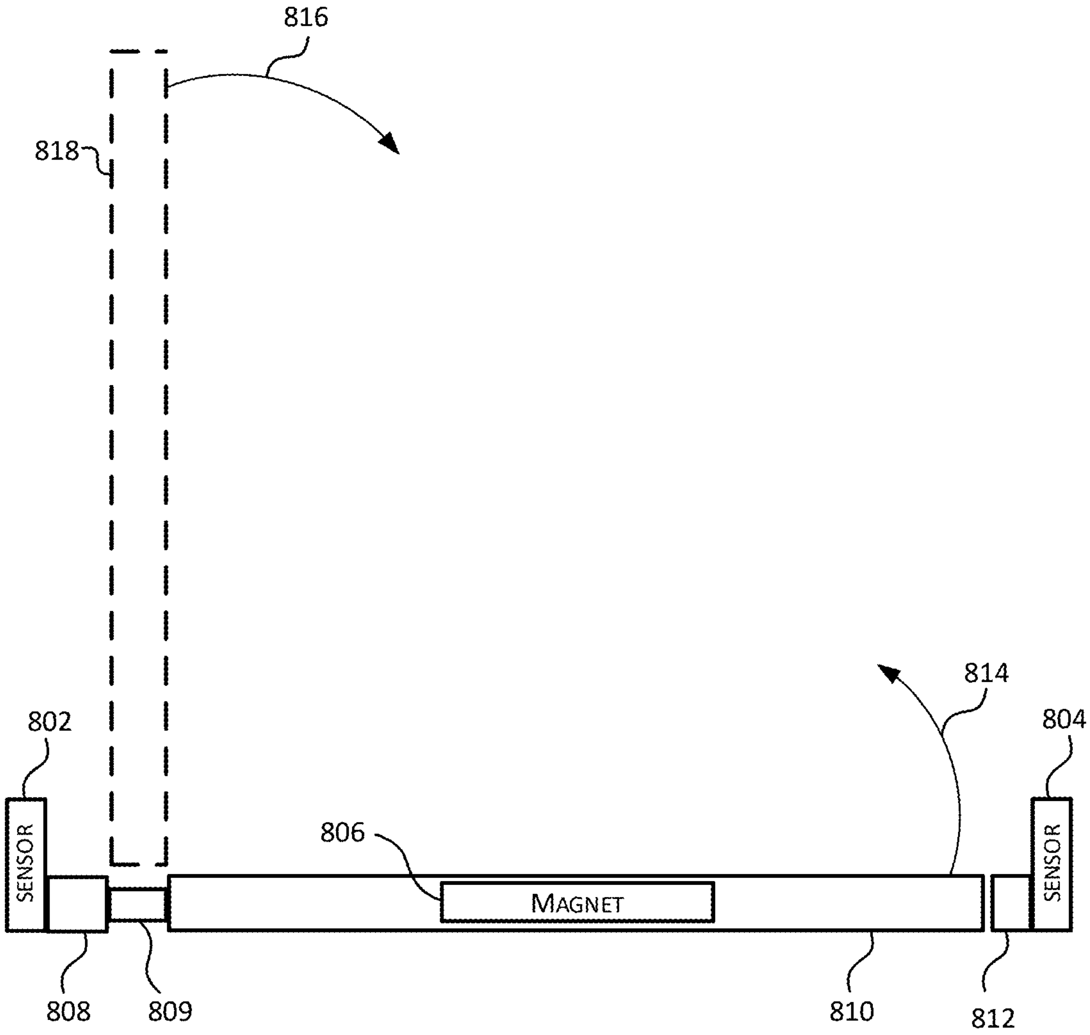
FIG. 8 shows a top down view of a configuration in which sensors are positioned to detect magnetic fields generated by a magnet.

FIG. 8 shows a top down view of a configuration in which sensors are positioned to detect magnetic fields generated by a magnet. Referring to FIG. 8, sensors 802-804 may comprise any type of sensor including, for example, a Hall effect sensor (Hall sensor) or reed switch. The sensors 802-804 may be configured to detect one or more magnetic fields that are generated by magnet 806. Further, based on the detection of one or more magnetic fields generated by the magnet 806, the sensors 802-804 may be configured to generate output comprising one or more indications that one or more magnetic fields were detected by the sensors 802-804. Further, the sensors 802-804 may comprise features and/or capabilities of one or more sensors described herein including the sensors 302-304 which are described with respect to FIG. 3. For example, each of the sensors 802-804 may comprise a computing device (e.g., a computing device comprising a processor, a memory, and/or a communications interface) and may be configured to send and/or receive data, send and/or receive instructions, and/or process data and/or instructions. For example, the sensors 802-804 may be configured to send one or more indications (e.g., a second indication of whether a magnetic field is detected in a first detectable region and/or a first null region) to a computing device (e.g. the security computing device 119 and/or the security server 122).

In FIG. 8, the magnet 806 may be attached to the element 810 (e.g., a door or window). A magnetic field of the magnet 806 may be detected by the sensor 802 that is attached to the element 808 (e.g., a first portion of a door frame or window frame) and/or the sensor 804 that is attached to the element 812 (e.g., a second portion of a door frame or window frame). The element 810 may be configured to move (e.g., pivot) along the element 809 (e.g., a hinge) that may be attached to the element 810 and/or the element 808. In this example, the element 810 is in a closed position (e.g., a closed door or window) and may be configured to move in the direction 814 to the position 818 (e.g., an open position). Moving the element 810 from the position 818 and in the direction 816 may return the element 810 to the closed position. Movement of the element 810 may cause the magnet 806 to move and may change the strength of the magnetic field detected by the sensor 802 and the sensor 804. As described herein, movement of the magnet 806 may cause the magnet to be located within a first null region (e.g., the null region B1 364 described with respect to FIG. 3) in which the magnetic field generated by the magnet 806 is not detected by the sensor 804 or a second null region (e.g., the null region A2 372 described with respect to FIG. 3) in which the magnetic field generated by the magnet 806 is not detected by the sensor 802. The determination that the element 810 is in the closed position may cause a computing device (e.g., the security computing device 119) to generate an indication that the element 810 is in the closed position. Based on a request from a user device (e.g., the mobile device 125), the computing device (e.g., the security computing device 119) may send an indication that the element 810 is in the closed position to the user device.

Figure 9:
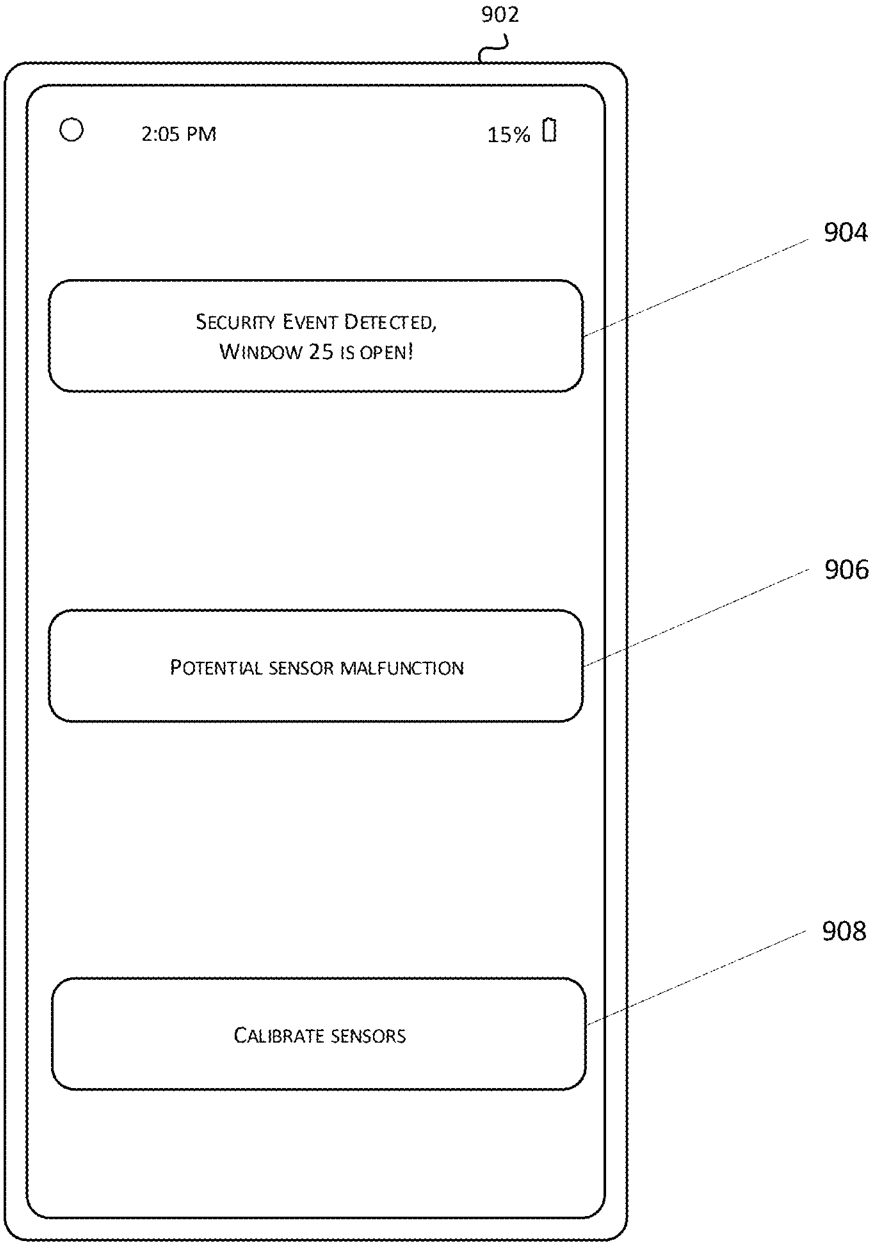
FIG. 9 shows an example of a user interface of a security system.

FIG. 9 shows an example of a user interface of a security system. Any of the computing devices shown in FIGS. 1-2 (e.g., the one or more mobile devices 125 and/or the security server 122) and/or any other computing devices described herein may be used to implement any of the operations described herein.

Computing device 902 (e.g., a smartphone) may display a user interface that includes interface elements 904-908. Interface element 904 may be generated based on data received from a security system that may send an indication of whether a door and/or window is open or closed based on output from one or more sensors (e.g., any of the sensors described with respect to FIGS. 3-5) that are configured to detect a magnetic field. For example, the security system may comprise one or more sensors that are attached to the frame of a window and are configured to detect whether the window is in an open position or a closed position. The security system may be configured to be deactivated which will not result in the generation of a security alert (e.g., an indication that indicates that authorized opening of the window has occurred) if the window is open. Further, the security system may be configured to be active and send an indication that a security event has occurred if the window is in the open position. In FIG. 9, the security system has sent an indication that a security event (e.g., an open window) has been detected by the security system. Based on receiving the indication of the security event, the computing device 902 may generate the interface element 904 which may comprise an indication that indicates "SECURITY EVENT DETECTED, WINDOW 25 IS OPEN!" The interface element 904 may indicate that a security event was detected, the type of security event (e.g., a window is open), and a location at which the security event was detected (e.g., the window 25 indicated in the interface element 904).

Further, the interface element 906 may be generated based on data received from a security system that may send an indication of a potential sensor issue based on output from one or more sensors (e.g., any of the sensors described with respect to FIGS. 3-5) that have been evaluated to determine whether the one or more sensors' ability to detect a magnetic field is below some threshold. For example, the security system may comprise one or more sensors (e.g., any of the sensors described with respect to FIGS. 3-5) that are attached to the frame of a door. The security system may be configured to determine whether there is a potential issue with the one or more sensors based on whether the strength of a magnetic field detected by the one or more sensors is within a detectable range (e.g., a detectable range that corresponds to accurate detection of a magnetic field by the one or more sensors). Further, the security system may be configured to send an indication of a potential sensor issue if the magnetic field detected by the one or more sensors is outside the detectable range. In FIG. 9, the security system has sent an indication that a potential issue has been determined by the security system. Based on receiving the indication of the potential issue, the computing device 902 may generate the interface element 906 which comprises an indication that indicates "POTENTIAL SENSOR ISSUE."

Further, based on receiving the indication of the potential security issue, the computing device 902 may generate the interface element 908. The interface element 908 may indicate "CALIBRATE SENSORS" and a user interaction (e.g., a user touching the interface element 908) with the interface element 908 may cause the computing device 902 to cause one or more sensors of the security system to be calibrated. For example, based on the interface element 908 being touched by a user, the computing device 902 may cause a security system to calibrate one or more sensors (e.g., any of the sensors described with respect to FIGS. 3-5) of the security system.

Figure 10:
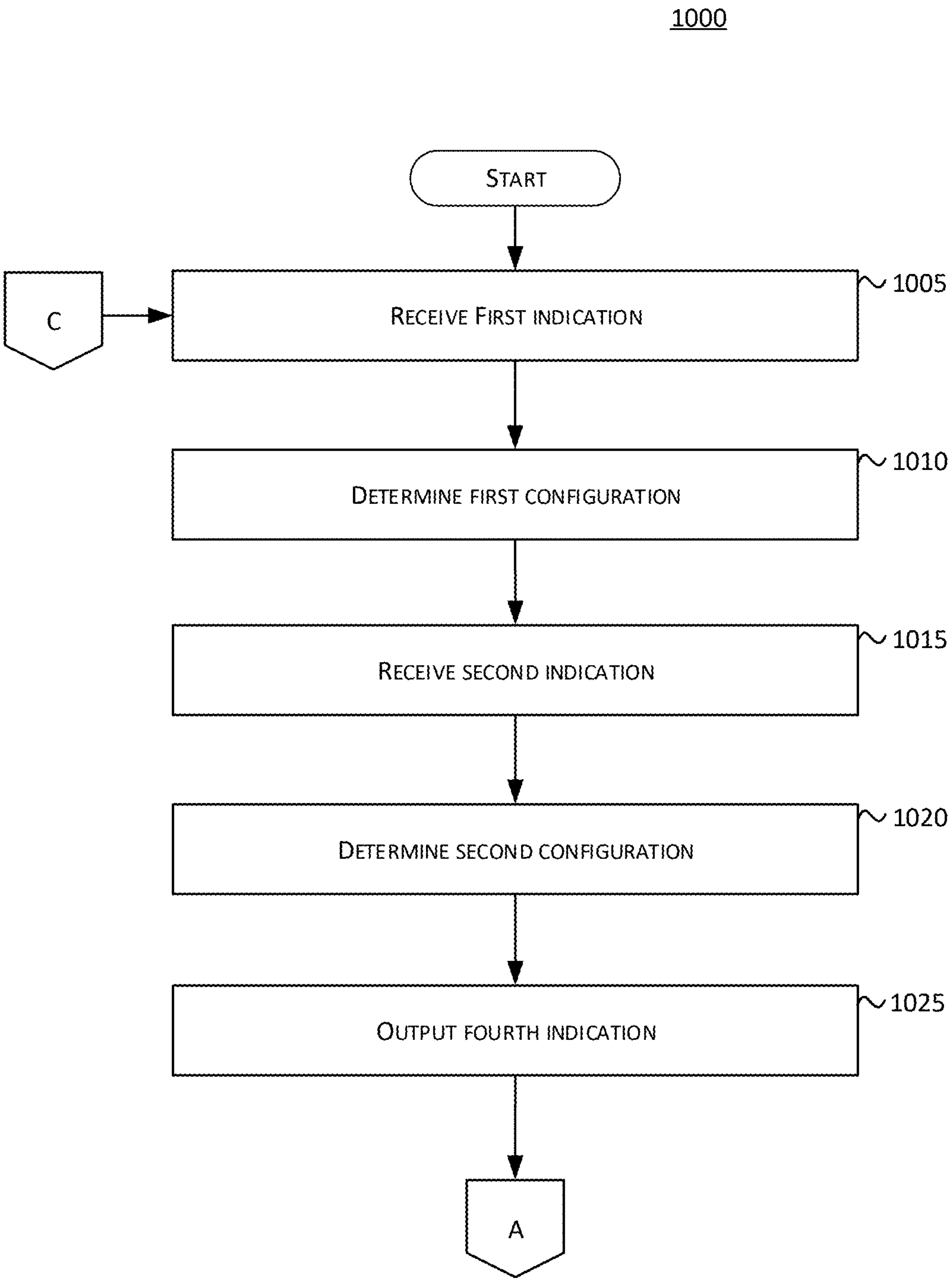
FIG. 10 is a flow chart showing steps for detecting a potential security event in a security system.

FIG. 10 is a flow chart showing steps for detecting a potential security event. The steps of the method 1000 may be performed by any device described herein, including the security computing device 119, the security server 122, and/or the one or more mobile devices 125. Further, one or more of the steps of method 1000 may be performed as part of the method 1100 described with respect to FIG. 11 and/or the method 1200 that is described with respect to FIG. 12. One, some, or all steps of the method 1000 may be omitted, performed in other orders, and/or otherwise modified, and/or one or more additional steps may be added.

In step 1005, a first indication may be received. The first indication may be received from a first sensor (e.g., any of the sensor 302, the sensor 402, or sensor 502). The first indication may indicate a magnetic field strength corresponding to a magnet (e.g., the magnet 306) being located in a first detectable region of a plurality of detectable regions (e.g., detectable region A 320, detectable region B 322, detectable region C 324, detectable region D 326, or detectable region E 328) associated with the first sensor. The magnet may be movable, relative to the first sensor and a second sensor, based on movement of an object (e.g., a door or window).

The magnetic field may not be detectable by the first sensor if the magnet is in a first null region (e.g., null region A1 362) or a second null region (e.g., null region A2 372) associated with the first sensor. For example, the security computing device 119 may receive sensor data from a first sensor that is configured to detect magnetic fields and generate an indication of whether a magnetic field was detected by the first sensor and/or indicate the magnetic field strength of magnetic fields detected by the first sensor (e.g., a measurement of a magnetic field). Further, at least one of the first indication, the second indication, the third indication, and/or the fourth indication may comprise a measurement of a magnetic field.

The first sensor may be configured to detect the magnetic field strength of a magnetic field generated by a magnet (e.g., the magnet 306 described with respect to FIG. 3) if the magnet is in one of the plurality of detectable regions, a third null region (e.g., null region B1 364), or a fourth null region (e.g., null region B2 374). The plurality of detectable regions may be different from the third null region and fourth null region. As described with respect to FIGS. 3-5, one or more sensors (e.g., the sensor 302, the sensor 402, and/or the sensor 502) may be configured to detect a magnetic field generated by a magnet in different regions. Further, the magnetic field may not be detectable by the first sensor if the magnet is in a first null region (e.g., null region A1 362) or a second null region (e.g., null region A2 372). A determination of whether the magnet is in one of the plurality of detectable regions, a third null region, or a fourth null region may be based on the strength of the magnetic field that is detected. The range of magnetic field strength values when the magnet is in the one of the plurality of detectable regions may be different from the range of magnetic field strength values when the magnet is in the first null region or second null region.

For example, the plurality of detectable regions may comprise a plurality of locations in which a plurality of magnetic field strengths of the magnet within the plurality of locations is detected by the first sensor. A first plurality of magnetic field strengths may correspond to the magnet being in a first detectable region and may comprise magnetic field strength values ranging from 10 mT to 12 mT. If the strength of the magnetic field detected by the first sensor is 11 mT, the magnet may be determined to be in the first detectable region. If the strength of the magnetic field detected by the first sensor is 8 mT, the magnet may be determined not to be in the first detectable region.

At least one of the first indication, the second indication, the third indication, or the fourth indication may comprise a binary value indicating detection or non-detection of a magnetic field. For example, if the first sensor comprises a reed switch, the first indication may comprise a binary value (e.g., a value of either 0 or 1) that indicates whether a magnetic field was detected or not detected.

The plurality of detectable regions may comprise at least a first detectable region, a second detectable region, a third detectable region, a fourth detectable region, and a fifth detectable region. The first detectable region, the second detectable region, the third detectable region, the fourth detectable region, the fifth detectable region, the first null region, the second null region, the third null region, and the fourth null region may be different regions. For example, as described with respect to FIG. 3, the first detectable region 320, the second detectable region 322, the third detectable region 324, the fourth detectable region 326, the fifth detectable region 328, the null region A1 362, the null region A2 372, the null region B1 364, and the null region B2 374 may be different regions. Further, the first detectable region, the second detectable region, the third detectable region, the fourth detectable region, the fifth detectable region, the first null region, the second null region, the third null region, and the fourth null region may not overlap. For example, as described with respect to FIG. 3, the first detectable region 320, the second detectable region 322, the third detectable region 324, the fourth detectable region 326, the fifth detectable region 328, the null region A1 362, the null region A2 372, the null region B1 364, and the null region B2 374 may not overlap any of the other regions.

The first null region may be surrounded by two detectable regions of the plurality of detectable regions. For example, the first detectable region (e.g., detectable region A 320) and the second detectable region (e.g., detectable region B 322) may surround a first null region (e.g., null region A1 362) that is spheroid shaped and within which a magnetic field is not detected and/or detectable by the first sensor. The first null region may be located outside a detection range of the first sensor. For example, the first null region may comprise an area in which the magnetic field is zero and/or the first null region is not detectable by the first sensor (e.g., the first sensor is not sensitive enough to detect a magnetic field in the first null region and/or the first sensor is configured not to output an indication that a magnetic field is detected when the strength of the magnetic field is within a detectable range).

The first sensor may comprise one or more sensors and may comprise one or more sensors described herein (e.g., any of the sensors described with respect to FIGS. 3-5). For example, the first sensor may comprise one, two, three, or more sensors that may operate individually and/or in combination with one or more other sensors to detect one or more magnetic fields and/or the strength of one or more magnetic fields.

The first sensor may comprise a reed switch in which the reed switch comprises contacts that are configured to open or close based on the presence of a magnetic field that is detected by the reed switch. The contacts of the reed switch may open if a magnetic field is not detected or close if a magnetic field is detected. The first sensor may be configured to cause a first indication that a magnetic field is detected to be generated based on the contacts of the reed switch being in a closed state. Further, the first sensor may be configured to cause a first indication that a magnetic field is not detected to be generated based on the contacts of the reed switch being in an open state.

The first sensor may comprise a hall effect sensor (Hall sensor). The Hall effect sensor may comprise a metallic portion (e.g., gallium arsenide, indium arsenide, or indium antimonide) through which an electric current is passed. For example, the metallic portion may comprise a flat cuboid strip that has a length and width that are significantly longer than the height of the strip (e.g., a length that is four times greater than the width and forty times greater than the height). The strip may comprise a first side and a second side that correspond to the two surfaces of the metallic portion that have the largest surface area. A magnetic field that is perpendicular to the portion of metal of the Hall effect sensor may cause a difference in voltage between the first side and the second side of the metallic portion of the Hall effect sensor. The difference in voltage (the Hall voltage) may be proportional to the strength of a magnetic field that is detected by the Hall effect sensor. The Hall sensor may for example, output a strength of the magnetic field comprising a numerical value in which the numerical value is positively correlated with the strength of the magnetic field.

The magnet may comprise at least one permanent magnet. For example, the magnet may comprise a metal alloy permanent magnet (e.g., a neodymium iron boron magnet, an aluminum nickel cobalt magnet, or a samarium cobalt magnet) or a ceramic permanent magnet (e.g., a ferrite magnet). Further, the magnet may comprise at least one electromagnet (e.g., an electromagnet comprising a copper wire wrapped around an iron core and having an electric current passed through the copper wire to generate a magnetic field). The magnet may be attached to the object (e.g., a door, window, or drawer). Further, movement of the object may correspond to movement of the magnet. For example, if the magnet is attached to a door, the magnet will move with the door as the door is opened and/or closed.

In step 1010, a first configuration of an object may be determined. The first configuration may be based on the first indication indicating a magnetic field strength corresponding to the magnet being located in one of the plurality of detectable region. The object may comprise a door, a window, or a drawer to which the magnet is attached. Further, the object may be configured to be moveable through a plurality of locations comprising the first detectable region, the second detectable region, the third detectable region, the fourth detectable region, the fifth detectable region, the first null region, the second null region, the third null region, and the fourth null region. For example, a door may be configured to move from a closed position to an open position such that fully opening or closing the door may result in the magnet moving through, the first detectable region, the second detectable region, the third detectable region, the fourth detectable region, the fifth detectable region, the first null region, the second null region, the third null region, and the fourth null region.

The first configuration of the object may comprise a door being open or closed, a window being open or closed, or a drawer being open or closed. For example, based on the first indication indicating a magnetic field strength corresponding to the magnet being located in one of the plurality of detectable regions, a door, window, and/or drawer may be determined to be closed. For example, a computing device (e.g., the security computing device 119 and/or the security server 122) may determine that a deerdrawer, window, or door may be closed based on the first indication indicating a magnetic field strength corresponding to the magnet being located in one of the plurality of detectable regions. The first configuration of the object may be different from (e.g., not match) the second configuration of the object. For example, if the first configuration of the object corresponds to the object (e.g., a door) being closed, the second configuration may not correspond to the door being closed. If the first configuration of an object corresponds to a door being closed, the second configuration of the object may correspond to the door being open. Further, the first configuration of the object may correspond to a first security condition (e.g., the object is in a safe condition in which a door is closed). The first security condition may be different from (e.g., not match) the second security condition. For example, if the first security condition corresponds to the object (e.g., a window) having a safe condition (e.g., the window being closed), the second security condition may not correspond to the object having a safe condition (e.g., the window being closed). If the first security condition corresponds to a window being closed, the second security condition may correspond to the window being open. The magnet being located in one of the plurality of detectable regions, the first null region, or the second null region may correspond to the first security condition. The magnet being located in another one of the plurality of detectable regions, the third null region, or the fourth null region may correspond to the second security condition.

Determining the first configuration of the object may be based on a fifth indication, from the second sensor, of a magnetic field strength corresponding to the magnet being located in a third null region (e.g., null region B1 364) or a fourth null region (e.g., null region B2 374) associated with the second sensor. For example, the sensor may generate a fifth indication that the magnet is located in the third null region or the fourth null region associated with the second sensor based on the strength of the magnetic field detected by the second sensor decreasing and then not being detected by the second sensor.

In step 1015, a second indication may be received. The second indication may be received from a second sensor (e.g., any of the sensor 304, the sensor 404, or sensor 504). The second indication may indicate a magnetic field strength corresponding to a magnet (e.g., the magnet 306) being located in one of the plurality of detectable regions (e.g., the first detectable region 320, the second detectable region 322, the third detectable region 324, the fourth detectable region 326, the fifth detectable region 328) associated with the second sensor. The magnetic field may not be detectable by the second sensor if the magnet is located in the third null region or the fourth null region associated with the second sensor. For example, the security computing device 119 may receive sensor data from a second sensor that is configured to detect magnetic fields and generate an indication of whether a magnetic field was detected by the second sensor and/or indicate the magnetic field strength of magnetic fields detected by the second sensor.

The second sensor may be configured to detect the magnetic field strength of a magnetic field generated by a magnet (e.g., the magnet 306 described with respect to FIG. 3) if the magnet is in one of a plurality of detectable regions as described with respect to FIGS. 3-5, one or more sensors (e.g., the sensor 302, the sensor 402, and/or the sensor 502) may be configured to detect a magnetic field generated by a magnet in different regions. Further, the magnetic field may not be detectable by the second sensor if the magnet is in the third null region or the fourth null region. A determination of whether the magnet is in a detectable region, the third null region, or the fourth null region may be based on the strength of the magnetic field that is detected. The range of magnetic field strength values when the magnet is in one of the plurality of detectable regions may be different from the range of magnetic field strength values when the magnet is in a different one of the plurality of detectable regions.

In step 1020, a second configuration of an object may be determined. The second configuration may be based on the second indication indicating a magnetic field strength corresponding to the magnet being located in one of the plurality of detectable regions. The second configuration of the object may comprise a door being open or closed, a window being open or closed, or a drawer being open or closed. For example, based on the second indication indicating a magnetic field strength corresponding to the magnet being located outside of the plurality of detectable regions, a door, window, and/or drawer may be determined to be open. For example, a computing device (e.g., the security computing device 119 and/or the security server 122) may determine that a door, window, or deerdrawer may be open based on the second indication indicating a magnetic field strength corresponding to the magnet being located outside of the plurality of detectable regions. The second configuration of the object may be different from (e.g., not match) the first configuration of the object. For example, if the second configuration of the object corresponds to the object (e.g., a door) being open, the first configuration may not correspond to the door being open. If the second configuration of an object corresponds to a door being open, the first configuration of the object may correspond to the door being closed. Further, the second configuration of the object may correspond to a second security condition (e.g., the object is in an unsafe condition in which a door is open). The second security condition may be different from (e.g., not match) the first security condition. For example, if the second security condition corresponds to the object (e.g., a window) having an unsafe condition (e.g., the window being open), the first security condition may not correspond to the object having an unsafe condition (e.g., the window being open). If the second security condition corresponds to a window being open, the first security condition may correspond to the window being closed.

In step 1025, a fourth indication may be outputted. The fourth indication may indicate one of the first configuration of the object or the second configuration of the object. The outputting of the fourth indication may be based on the magnetic field strength detected by the first sensor or the second sensor. For example, if the first indication of the magnetic field strength indicates that the magnet is located in the first detectable region, the security computing device 119 may output a fourth indication that the magnet is in a first configuration that may correspond to the magnet being located in the first detectable region. Further, if the second indication of the magnetic field strength indicates that the magnet is located in the second detectable region, the security computing device 119 may output a fourth indication that the magnet is in a second configuration that may correspond to the magnet being located in the second detectable region. After outputting the fourth indication, step 1105 may be performed by way of the “A” connector.

Figure 11:
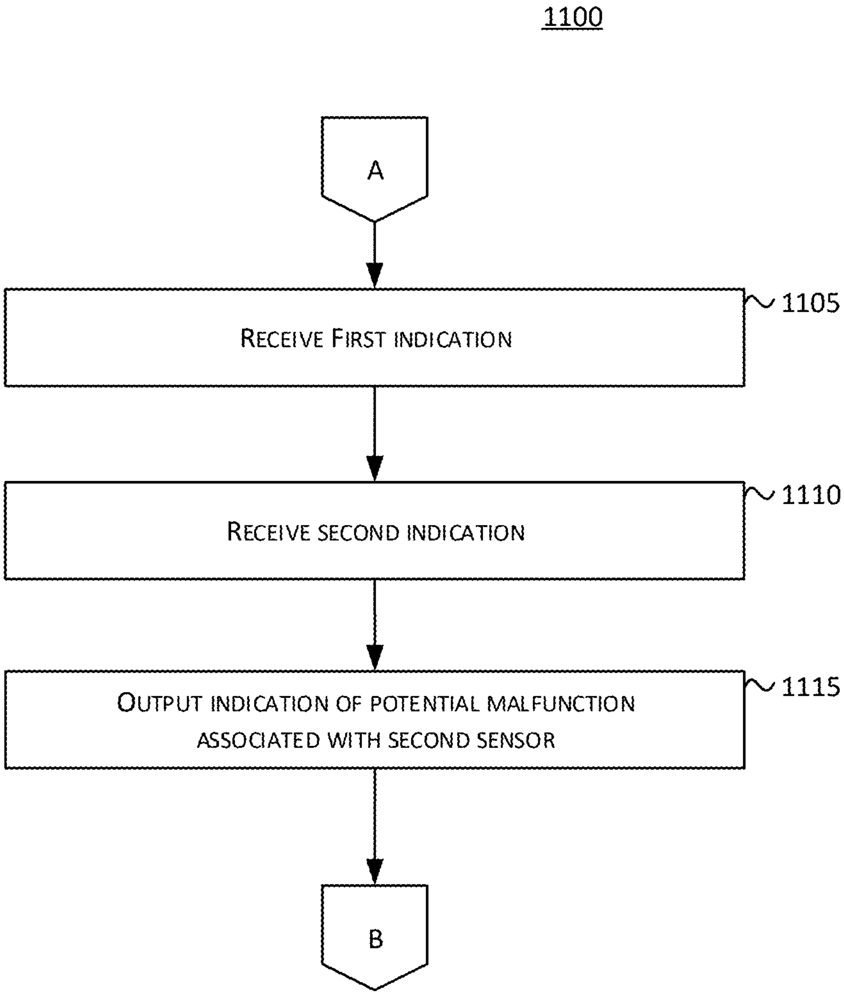
FIG. 11 is a flow chart showing steps for detecting potential malfunctions in a security system.

FIG. 11 is a flow chart showing steps for detecting potential malfunctions in a security system. Further, one or more of the steps described with respect to FIG. 11 may be part of the method 1000 that is described with respect to FIG. 10 and/or the method 1200 that is described with respect to FIG. 12. As indicated by the “A” connector, the steps of FIG. 11 may be performed based on the performance of step 1025 of the method 1000. The steps of FIG. 11 may be performed by any device described herein, including the security computing device 119, the security server 122, and/or one or more mobile devices 125. One, some, or all steps of FIG. 11 may be omitted, performed in other orders, and/or otherwise modified, and/or one or more additional steps may be added.

In step 1105, a first indication may be received. The first indication may comprise an indication of a magnetic field strength of a magnet (e.g., the magnet 306) that is moveable, relative to a first sensor (e.g., the sensor 302) and a second sensor (e.g., the sensor 304), based on movement of an object (e.g., a door or window). For example, the security computing device 119 may receive first sensor data from a first sensor that is configured to detect magnetic fields and generate the first indication of the magnetic field strength of magnetic fields detected by the first sensor. Further, the security computing device 119 may receive second sensor data from a second sensor that is configured to detect magnetic fields and generate the second indication of the magnetic field strength of magnetic fields detected by the second sensor. The first indication may comprise a sixth indication. Further, a sixth indication that comprises all of the features and/or capabilities of the first indication may be received and/or processed similarly and/or in the same manner as the first indication.

The first sensor and/or the second sensor may comprise one or more sensors including one or more sensors described herein (e.g., the sensors described with respect to FIGS. 1-11). For example, the first sensor and/or the second sensor may comprise one or more sensors that may operate individually and/or in combination with one or more other sensors to detect one or more magnetic fields and/or the strength of one or more magnetic fields. Further, the first sensor and/or the second sensor may comprise a reed switch and/or a Hall effect sensor.

In step 1110, a second indication may be received. The second indication may comprise an indication of a magnetic field strength, of the magnet, that comprises an inconsistency with a configuration of the object corresponding to the first indication. The inconsistency may comprise the magnetic field strength indicated in the first indication being at least a first threshold amount greater or less than the magnetic field strength indicated in the second indication. For example, the first indication may indicate that the magnetic field strength detected by the first sensor (e.g., the sensor 302) is 2 mT. The first threshold amount may be 12 mT. If the second indication indicates that the magnetic field strength detected by the second sensor (e.g., the sensor 304) is 15 mT, then the magnetic field strength detected by the second sensor would be greater than the magnetic field strength detected by the first sensor by 13 mT which is also greater than the first threshold amount. The second indication may comprise a seventh indication. Further, a seventh indication that comprises all of the features and/or capabilities of the second indication may be received and/or processed similarly and/or in the same manner as the second indication.

The inconsistency may comprise the magnetic field strength indicated in the first indication being within a first range of magnetic field strengths and the magnetic field strength indicated in the second indication being a second threshold amount greater or less than the magnetic field strength indicated in the first indication. For example, the first indication may indicate that the magnetic field strength detected by the first sensor (e.g., the sensor 302) is 2 mT. If the first range of magnetic field strengths is between 0 mT and 1 mT then the magnetic field strength indicated in first indication may not be compared to the magnetic field strength indicated in the second indication. If the first range of magnetic field strengths is between 0 mT and 2 mT, then the magnetic field strength indicated in the first indication would be within the first range of magnetic field strengths and the magnetic field strength indicated in the first indication would be compared to the magnetic field strength indicated in the second indication. The second threshold amount may be 8 mT. If the second indication indicates that the magnetic field strength detected by the second sensor (e.g., the sensor 304) is 12 mT, then the magnetic field strength detected by the second sensor would be greater than the magnetic field strength detected by the first sensor by 13 mT which is also greater than the first threshold amount.

The second indication may be received substantially simultaneously with the first indication. For example, the first indication and the second indication may be received within 1 second of each other, 500 milliseconds of each other, or 100 milliseconds of each other.

In step 1115, an indication (e.g., a message) of a potential malfunction associated with the second sensor may be outputted. For example, the security computing device 119 may generate a message (e.g., the interface element 906) that indicates that one or more of the sensors are potentially malfunctioning. The indication of the potential malfunction may be based on the first indication and/or the second indication. For example, the indication of a potential malfunction may be based on the first indication being at least a first threshold amount greater than the magnetic field strength indicated in the second indication as described with respect to step 1110. Further, the indication of a potential malfunction may be based on the magnetic field strength indicated in the first indication being within a first range of magnetic field strengths and the magnetic field strength indicated in the second indication being a second threshold amount greater or less than the magnetic field strength indicated in the first indication as described with respect to step 1110. After outputting the indication of the potential malfunction associated with the second sensor, step 1205 may be performed by way of the “C” connector.

Figure 12:
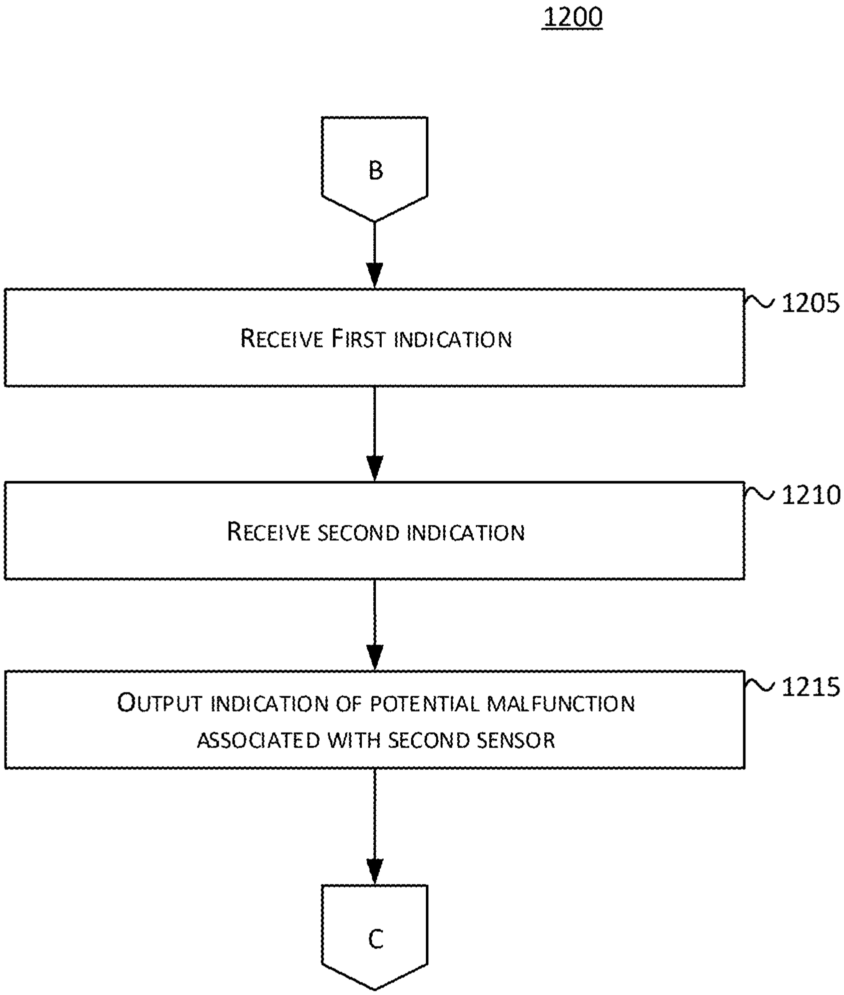
FIG. 12 is a flow chart showing steps for detecting potential malfunctions in a security system.

FIG. 12 is a flow chart showing steps for detecting potential malfunctions in a security system. Further, one or more of the steps described with respect to FIG. 12 may be part of the method 1000 that is described with respect to FIG. 10 and/or the method 1100 that is described with respect to FIG. 12. As indicated by the “B” connector, the steps of FIG. 12 may be performed based on the performance of step 1115 of the method 1100. The steps of FIG. 12 may be performed by any device described herein, including the security computing device 119, the security server 122, and/or one or more mobile devices 125. One, some, or all steps of FIG. 12 may be omitted, performed in other orders, and/or otherwise modified, and/or one or more additional steps may be added.

In step 1205, a first indication may be received. The first indication may be received from a first sensor. Further, the first sensor may correspond to a magnet (e.g., the magnet 306) being located in a first detectable region associated with the first sensor (e.g., the sensor 302). The magnet may be movable, relative to the first sensor and a second sensor (e.g., the sensor 304), based on movement of an object (e.g., a door or a window). For example, the security computing device 119 may receive first sensor data from a first sensor that is configured to detect magnetic fields and generate the first indication of a magnet being located in a first detectable region based on the magnetic field strength of magnetic fields detected by the first sensor corresponding to the magnet being located in the first detectable region. The first sensor and/or the second sensor may comprise one or more sensors including one or more sensors described herein (e.g., the sensors described with respect to FIGS. 1-11). For example, the first sensor and/or the second sensor may comprise one or more sensors that may operate individually and/or in combination with one or more other sensors to detect one or more magnetic fields and/or the strength of one or more magnetic fields. Further, the first sensor and/or the second sensor may comprise a reed switch and/or a Hall effect sensor. The first indication may comprise an eighth indication. Further, an eighth indication that comprises all of the features and/or capabilities of the first indication may be received and/or processed similarly and/or in the same manner as the first indication.

In step 1210, a second indication may be received. The second indication may be received from the second sensor. The second indication may correspond to the magnet being located outside of the first detectable region. For example, the security computing device 119 may receive a first indication and a second indication. The first indication may indicate that the magnetic field strength of the magnet is 10 mT, which may correspond to the magnet being located within the first detectable region. Further, the second indication may indicate that the magnetic field strength of the magnet is 20 mT, which may correspond to the magnet being located outside the first detectable region. The second indication may be received substantially simultaneously with the first indication. For example, the first indication and the second indication may be received within 1 second of each other, 500 milliseconds of each other, or 100 milliseconds of each other. The second indication may comprise a ninth indication. Further, a ninth indication that comprises all of the features and/or capabilities of the second indication may be received and/or processed similarly and/or in the same manner as the second indication.

In step 1215, an indication (e.g., a message) of a potential malfunction associated with the second sensor may be outputted. For example, the security computing device 119 may generate a message (e.g., the interface element 906) that indicates that the second sensor is potentially malfunctioning. The indication of the potential malfunction may be based on the first indication and/or the second indication. For example, the indication of a potential malfunction may be based on the first indication indicating that the magnet is in the first detectable region and the second indication indicating that the magnet is located outside the first detectable region. The inconsistency between the first indication and the second indication may indicate a potential malfunction associated with the second sensor.

In step 1220, the indication (e.g., a message) of the potential malfunction with the first sensor may be sent to a user device. The indication of the potential malfunction may comprise an indication that the first sensor and/or the second sensor may not be operating properly. For example, a user device (e.g., a smartphone) may be part of a security system and the indication of a potential malfunction may be sent to the user device (e.g., the mobile device 125). After sending the indication of the potential malfunction to a user device, step 1005 may be performed by way of the "C" connector.

Although some examples provided herein are in the context of a sensor attached to a door frame and a magnet attached to a corresponding door, or a sensor attached to a window frame and a magnet attached to a corresponding window, the devices, systems, and/or methods described herein are not so limited. The devices, systems, and/or methods described herein may be used with any type of structure that includes a first element (or object) that is moveable relative to a second element (or object). The devices, systems, and/or methods described herein may be used to detect a movement of the first element based on positioning the sensor on the first element and positioning the magnet on the second element. Alternatively, the device, systems, and/or methods described herein may be used to detect a movement of the first element based on positioning the magnet on the first element and positioning the sensor on the second element. The first element may comprise a physical element such as, for example, a hatch, a cabinet door, a first portion of a French door or double door, or a drawer and the second element may comprise a corresponding physical element such as, for example, a bulkhead, a cabinet frame, a wall, a second portion of a French door or double door, or a dresser or office cabinet. The devices, systems, and/or methods described herein may use various predetermined ranges, thresholds, levels, and/or values as described herein. Any predetermined range, threshold, level, and/or value may be stored or encoded into any of the devices described herein and/or may be modifiable be by a user.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by a computing device, a first plurality of indications, wherein at least one of the first plurality of indications corresponds to a magnetic field of a magnet located in one of a plurality of detectable regions in which the magnetic field is detectable by a first sensor or by a second sensor, and wherein at least one of the first plurality of indications corresponds to a first null region in which the magnetic field is not detectable by the first sensor or a second null region in which the magnetic field is not detectable by the first sensor;

receiving a second plurality of indications, wherein at least one of the second plurality of indications corresponds to the magnetic field of the magnet located in one of the plurality of detectable regions, and wherein at least one of the second plurality of indications corresponds to a third null region in which the magnetic field is not detectable by the second sensor or fourth null region in which the magnetic field is not detectable by the second sensor; and configuring at least one of the first sensor or the second sensor, based on the first and second pluralities of indications and relative to the magnet, such that:

the first sensor detects the magnetic field if the magnet is located in any of the plurality of detectable regions, the third null region, or the fourth null region, and the second sensor detects the magnetic field if the magnet is located in any of the plurality of detectable regions, the first null region, or the second null region.

2. The method of claim 1, wherein the configuring the first sensor or the second sensor relative to the magnet comprises:

modifying a position of the first sensor or the second sensor.

3. The method of claim 1, wherein the configuring the first sensor or the second sensor relative to the magnet comprises:

modifying a sensitivity to magnetic fields of the first sensor or the second sensor.

4. The method of claim 1, wherein the magnet being located in one of the plurality of detectable regions, the first null region, or the second null region corresponds to a first security condition, and wherein the magnet being located in another one of the plurality of detectable regions, the third null region, or the fourth null region corresponds to a second security condition.

5. The method of claim 1, wherein at least one of the first plurality of indications or the second plurality of indications comprises a binary value indicating detection or non-detection of the magnetic field.

6. The method of claim 1, wherein the first plurality of indications comprises a measurement of a magnetic field strength detected by the first sensor.

7. The method of claim 1, wherein the second plurality of indications comprises a measurement of a magnetic field strength detected by the second sensor.

8. The method of claim 1, wherein the magnet is movable, relative to the first sensor and the second sensor, based on movement of an object.

9. The method of claim 1, wherein the first sensor or the second sensor comprises a reed switch.

10. The method of claim 1, wherein the first sensor or the second sensor comprise a Hall effect sensor.

11. The method of claim 1, wherein the first null region and the second null region are associated with the first sensor, and each of the first null region and the second null region are surrounded by two different detectable regions of the plurality of detectable regions.

12. The method of claim 1, wherein the third null region and the fourth null region are associated with the second sensor, and each of the third null region and the fourth null region are surrounded by two different detectable regions of the plurality of detectable regions.

13. The method of claim 1, wherein the magnet is attached to an object, and wherein a movement of the magnet corresponds to the movement of the object.

14. The method of claim 1, wherein the plurality of detectable regions, the first null region, the second null region, the third null region, and the fourth null region are different regions and do not overlap.

15. An apparatus comprising:

a first sensor;

a second sensor offset from the first sensor; and a magnet configured to move relative to the first and second sensor and configured such that at least one of the first or second sensor can detect a magnetic field of the magnet regardless of null regions in the magnetic field of the magnet, wherein the magnetic field of the magnet is not detectable by the first sensor in a first null region and a second null region, and the magnetic field of the magnet is not detectable by the second sensor in a third null region and a fourth null region.

16. The apparatus of claim 15, wherein the first sensor can detect the magnetic field of the magnet if the magnet is located in a plurality of detectable regions, the third null region, or the fourth null region, and the second sensor can detect the magnetic field of the magnet if the magnet is located in the plurality of detectable regions, the first null region, or the second null region.

* * * * *